US012097429B2

(12) United States Patent
Ohashi et al.

(10) Patent No.: US 12,097,429 B2
(45) Date of Patent: Sep. 24, 2024

(54) INFORMATION PROCESSING SYSTEM, INFORMATION PROCESSING APPARATUS, STORAGE MEDIUM, AND GAME PROCESSING METHOD

(71) Applicant: NINTENDO CO., LTD., Kyoto (JP)

(72) Inventors: Yuji Ohashi, Kyoto (JP); Kouhei Maeda, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 449 days.

(21) Appl. No.: 17/511,990

(22) Filed: Oct. 27, 2021

(65) Prior Publication Data

US 2022/0134230 A1     May 5, 2022

(30) Foreign Application Priority Data

Nov. 2, 2020    (JP) ................................. 2020-183707

(51) Int. Cl.
*A63F 13/55*     (2014.01)

(52) U.S. Cl.
CPC .................................... *A63F 13/55* (2014.09)

(58) Field of Classification Search
CPC ......... A63F 13/35; A63F 13/822; A63F 13/55
See application file for complete search history.

(56) References Cited

FOREIGN PATENT DOCUMENTS

| JP | 2014-128454 A | 7/2014 |
|---|---|---|
| JP | 2017-074121 A | 4/2017 |
| JP | 2018-164586 A | 10/2018 |
| JP | 2019-092655 A | 6/2019 |
| JP | 2020-044035 A | 3/2020 |

OTHER PUBLICATIONS

Fire Emblem wiki: data transfer, evidence for Fire Emblem Radiant Dawn released 2007 (Year: 2024).*
Fire Emblem wiki: Oscar, evidence for Fire Emblem Radiant Dawn released 2007 (Year: 2024).*
"Learn with Sharena! Fire Emblem Heroes Building a Raiding Party", [online], Nintendo Co., Ltd., [searched on Oct. 15, 2020], internet https://guide.fire-emblem-heroes.com/en-US/eve006/, 3 pages.

(Continued)

*Primary Examiner* — Thomas H Henry
(74) *Attorney, Agent, or Firm* — Nixon & Vanderhye P.C.

(57) ABSTRACT

An example of an information processing system stores therein first ability data indicating abilities of possessed objects used in a first game. A use object to be used in a second game is selected from among the possessed objects. Second ability data indicating an ability of the use object is set so as to indicate an ability lower than the ability indicated by the first ability data of the possessed object that becomes the use object. When an update condition regarding the use object has been satisfied during execution of the second game, the second ability data is updated such that the ability of the use object having satisfied the update condition is strengthened. Regarding the update of the second ability data, an upper limit is set on at least a part of the ability of the use object, based on the ability indicated by the first ability data.

15 Claims, 22 Drawing Sheets

(56) References Cited

OTHER PUBLICATIONS

Pokemon, growing theory, level 50, [Pokemon beginner lecture], online May 16, 2020, <https://web.archive.org/web/20200516005231/https://pokemottoo.com//beginner-poke-doryokuti/>, 13 pages.
Notice of Reasons for Refusal for Japanese Application No. 2020-183707, six pages, date of mailing May 7, 2024.
Pokemon, growing theory, level 50, [Pokemon beginner lecture], online May 16, 2020, URL <https://web.archive.org/web/20200516005231/]//pokemottoo.com//beginner-poke-doryokuti/>, 13 pages.
Notice of Reasons for Refusal for Japanese Application No. 2020-183707, six pages, dated Apr. 25, 2024.

* cited by examiner

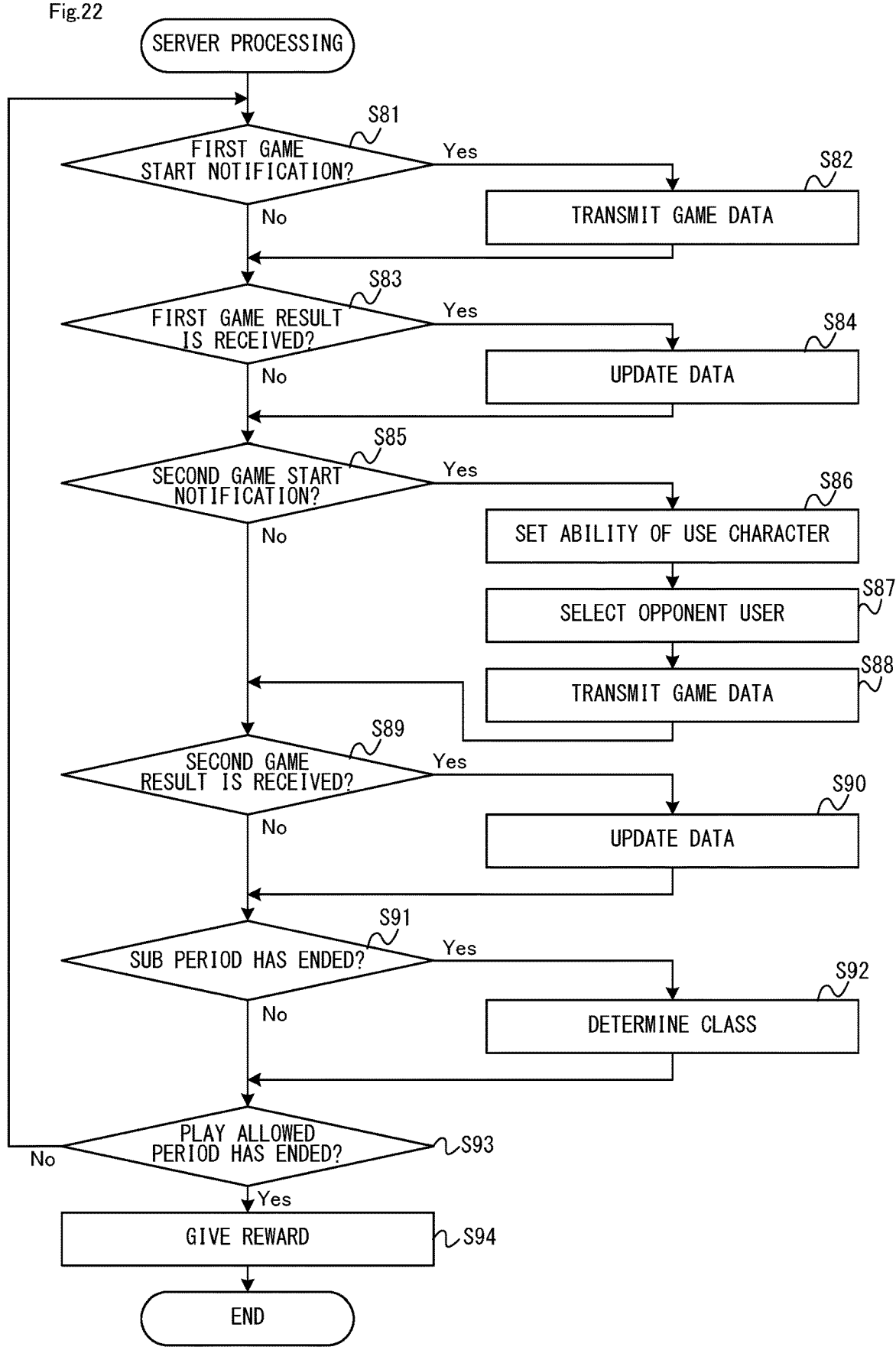

INFORMATION PROCESSING SYSTEM, INFORMATION PROCESSING APPARATUS, STORAGE MEDIUM, AND GAME PROCESSING METHOD

CROSS REFERENCE TO RELATED APPLICATION

This application claims priority to Japanese Patent Application No. 2020-183707, filed on Nov. 2, 2020, the entire contents of which are incorporated herein by reference.

FIELD

The technique shown here relates to an information processing system, an information processing apparatus, a storage medium, and a game processing method which are used for executing a game.

BACKGROUND AND SUMMARY

Conventionally, game objects used in a certain game are also used in another game to perform a plurality of types of games.

There is room for improvement in a game performed by using game objects of another game.

Therefore, the present application discloses an information processing system, an information processing apparatus, a storage medium, and a game processing method which enable a new game to be performed by using game objects of another game.

(1) An example of an information processing system comprises a processor and a memory coupled thereto. The memory is configured to store therein first ability data indicating abilities of one or more possessed objects in association with the respective possessed objects. The possessed objects are possessed by a user. The possessed objects are used in a first game executed by a game program. The processor is configured to control the information processing system to at least: select, from among the possessed objects, a use object to be used in a second game that is executed by the game program and is different from the first game; set second ability data indicating an ability of the use object in the second game such that the second ability data indicates an ability lower than the ability indicated by the first ability data associated with the possessed object that becomes the use object; execute the second game, based on the second ability data set on the use object; and when an update condition regarding the use object has been satisfied during execution of the second game, update the second ability data such that the ability of the use object having satisfied the update condition is strengthened. Regarding the update of the second ability data, an upper limit is set on at least a part of the ability of the use object, based on the ability indicated by the first ability data.

According to the configuration of the above (1), it is possible to provide a new game in which an object in another game (i.e., the first game) can be grown during a game (i.e., the second game).

(2) The processor may be configured to further control the information processing system to at least: execute the first game, based on the first ability data associated with the possessed object; and when an update condition regarding the possessed object has been satisfied, update the first ability data such that the ability of the possessed object having satisfied the update condition is strengthened.

According to the configuration of the above (2), since the upper limit of the ability of the use object in the second game is raised by strengthening the ability of the possessed object in the first game, which is advantageous to the user also in the second game. Therefore, motivation to play the first game can be given to the user.

(3) The update condition regarding the possessed object may be different from the update condition regarding the use object.

According to the configuration of the above (3), motivation to play both the first game and the second game can be given to the user by making the fun factors of the first game and the second game different from each other.

(4) Each time the second game is newly started, second ability data indicating the ability of the use object in the second game may be set.

According to the configuration of the above (4), since the ability of the use object is reset each time the second game is started, the user can repeatedly enjoy the second game including the growing elements.

(5) The second ability data indicating the ability of the use object in the second game may be set based on the first ability data that is stored in the memory at start of the second game and relates to the possessed object that becomes the use object.

According to the configuration of the above (5), since the ability of the possessed object can be reflected in the use object, motivation to play the first game can be given to the user whose plays the second game.

(6) In updating the second ability data, regarding the at least a part of the ability of the use object, an upper limit of the ability indicated by the first ability data may be made the same as the ability indicated by the second ability data.

According to the configuration of the above (6), motivation to play the first game can be given to the user whose plays the second game.

(7) Regarding the at least a part of the ability of the use object, the second ability data may be updated with an upper limit being greater than an upper limit of the ability indicated by the first ability data.

According to the configuration of the above (7), motivation to play the second game can be given to the user who desires to further strengthen the object.

(8) The memory may further store therein first ability data related to possessed objects that are possessed by another user different from the user. The use object may be selected from among the possessed objects of the user and the possessed objects of the other user.

According to the configuration of the above (8), the user can play the second game by using the possessed objects of the other user in addition to his/her possessed objects.

(9) When the update condition regarding the use object has been satisfied during execution of the second game, the second ability data may be updated such that the ability of the use object having satisfied the update condition and the ability of another use object different from the use object are strengthened.

According to the configuration of the above (9), it is possible to reduce a difference in ability between the use object having satisfied the update condition and the other use object.

(10) When the update condition regarding the use object has been satisfied during execution of the second game, the second ability data may be updated such that the ability of the use object having satisfied the update condition is more strengthened than the ability of the other use object.

According to the configuration of the above (10), the strategic characteristics of the second game can be improved.

(11) The first ability data may indicate at least one of ability parameters, of the possessed object, including a level, a physical strength, an attack power, a defense power, and a quickness. The second ability data may be set to a value smaller than a value of the ability parameter indicated by the first ability data.

According to the configuration of the above (11), the ability parameter of the use object can be strengthened in the second game.

(12) The first ability data may indicate one of a plurality of types of skills, of the same category, that exert effects of the same type and of different magnitudes in the game. The second ability data may be set so as to indicate a skill that is of the same category as the skill indicated by the first ability data and has an effect smaller in magnitude than the skill indicated by the first ability data.

According to the configuration of the above (12), the skill of the use object can be strengthened in the second game.

(13) In the second game, the use object based on the set second ability data may be placed in a virtual space of the second game. When the update condition regarding the use object placed in the virtual space has been satisfied during execution of the second game, the use object having satisfied the update condition may be changed so as to have an ability based on the updated second ability data.

According to the configuration of the above (13), it is possible to provide, as the second game using the possessed objects in the first game, a new game in which the abilities of the objects change during the game.

The present specification discloses an information processing apparatus (e.g., a terminal apparatus or a server) that executes the processes in the above (1) to (13). Moreover, the present specification discloses a storage medium having stored therein an information processing program (e.g., a game program) that causes a computer to execute a part or the entirety of the processes in the above (1) to (13). Moreover, the present specification discloses an information processing method (e.g., a game processing method) executed in the information processing system according to the above (1) to (13).

According to the information processing system, the information processing apparatus, the storage medium, and the game processing method, it is possible to execute a new game by using a game object in another game.

These and other objects, features, aspects and advantages of the exemplary embodiment will become more apparent from the following detailed description when taken in conjunction with the accompanying drawings.

BRIEF DESCRIPTION OF THE DRAWINGS

FIG. 22 is a flowchart showing an example of a flow of server processing executed by the server.

DETAILED DESCRIPTION OF NON-LIMITING EXAMPLE EMBODIMENTS

1. Configuration of Information Processing System

Figure 1:
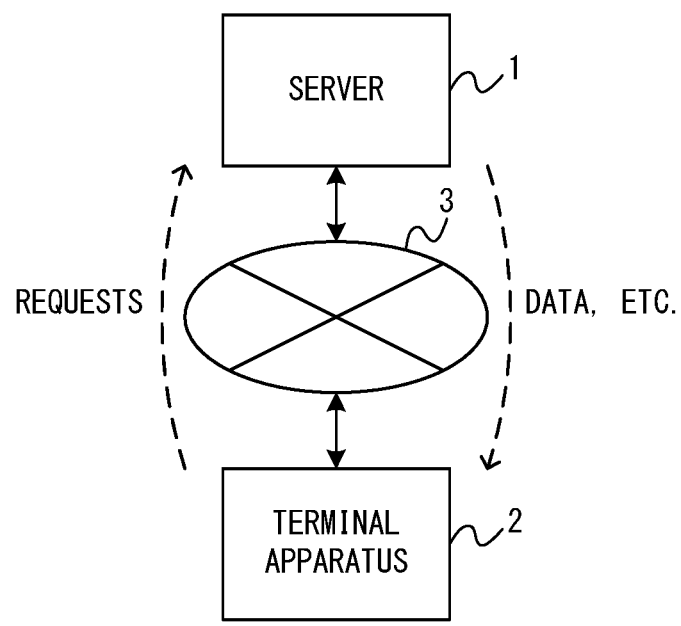
FIG. 1 is a block diagram showing an example of the configuration of a non-limiting information processing system according to the present embodiment.

Hereinafter, an information processing system, an information processing program, and an information processing method according to the present embodiment will be described. Firstly, description will be given of the overall configuration of the information processing system and the configurations of the terminal apparatus and a server included in the information processing system according to the present embodiment. FIG. 1 is a block diagram showing an example of the configuration of the information processing system according to the present embodiment. As shown in FIG. 1, the information processing system includes a server 1 and a terminal apparatus 2. The server 1 and the terminal apparatus 2 are connectable to a network 3, such as the Internet and/or a mobile communication network. The server 1 and the terminal apparatus 2 are communicable with each other via the network 3.

The server 1 is a server for providing services related to an application (specifically, a game application) to be executed in the terminal apparatus 2. In the present embodiment, the server 1 is a game server for a game to be executed in the terminal apparatus 2, and provides an environment for a game process to be executed in the terminal apparatus 2. For example, in response to a request from the terminal apparatus 2 that executes the game process, the server 1 executes a game process according to need, and transmits, to the terminal apparatus 2, data complying with the request (refer to FIG. 1).

The terminal apparatus 2 is an example of an information processing apparatus possessed by a user. Examples of the terminal apparatus 2 include a smart phone, a hand-held or stationary game apparatus, a mobile phone, a tablet terminal, a personal computer, and a wearable terminal. The terminal apparatus 2 is able to execute a game program (in other words, a game application) for a game for which the server 1 provides services.

(Specific Example of Configuration of Server 1)

Figure 2:
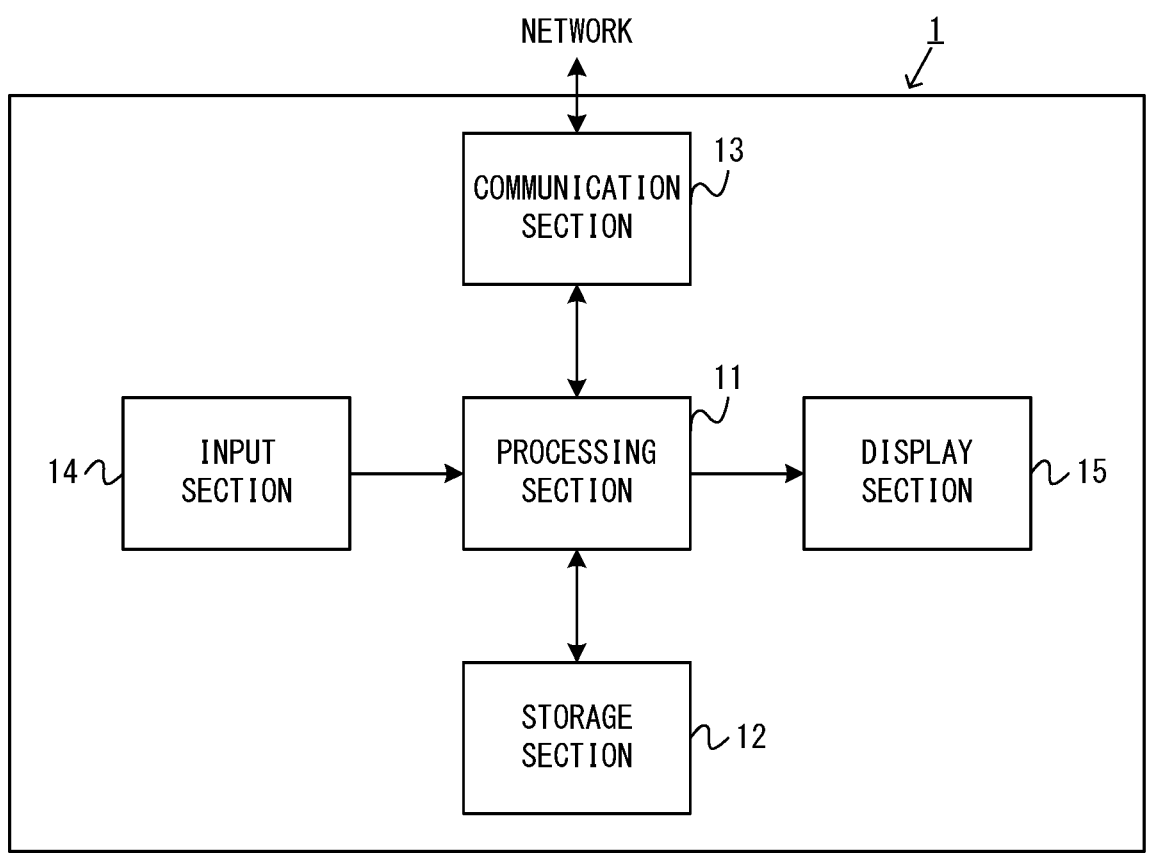
FIG. 2 is a block diagram showing an example of the configuration of a non-limiting server.

FIG. 2 is a block diagram showing an example of the configuration of the server 1. In FIG. 2, each of components included in the server 1 is implemented by one or more information processing apparatuses. In this specification, the "server" means one information processing apparatus (i.e., a server apparatus). When the function of the server is implemented by a plurality of server apparatuses, the "server" means the entirety of a server apparatus group (i.e., a server system). That is, the "server" may be a server apparatus or a server system. When a plurality of information processing apparatuses are included in the server system, these information processing apparatuses may be arranged in the same place or different places. The hardware configuration of the server 1 of the present embodiment may be the same as that for a conventional server.

As shown in FIG. 2, the server 1 includes a processing section 11 and a storage section 12. The processing section 11 is electrically connected to the components 12 to 15 of the server 1. The processing section 11 includes a CPU (Central Processing Unit, in other words, a processor) and a memory. In the server 1, the CPU executes, using the memory, programs stored in the storage section 12, thereby executing various kinds of information processing. The storage section 12 is any storage device (also referred to as "storage medium") that is accessible to the processing section 11. The storage section 12 stores therein programs to be executed in the processing section 11, data to be used for information processing by the processing section 11, data obtained through the information processing, etc. In the present embodiment, the storage section 12 stores therein at least a program for a game process that is to be executed on the server side for a game process to be executed in the terminal apparatus 2.

The server 1 includes a communication section 13. The communication section 13 is connected to the network 3, and has a function of communicating with other devices (e.g., the terminal apparatus 2) via the network 3. The server 1 further includes an input section 14 and a display section 15 as input/output interfaces.

(Specific Example of Configuration of Terminal Apparatus 2)

Figure 3:
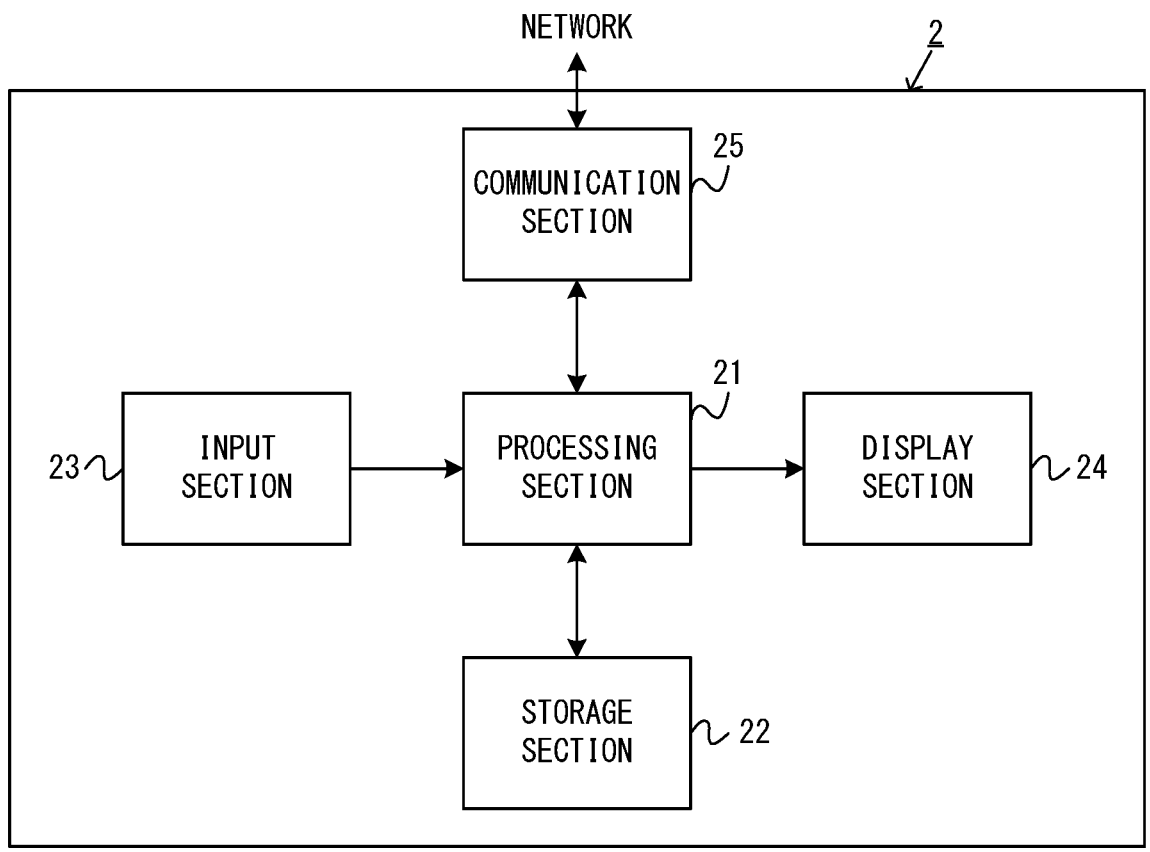
FIG. 3 is a block diagram showing an example of the configuration of a non-limiting terminal apparatus.

FIG. 3 is a block diagram showing an example of the configuration of the terminal apparatus 2. As shown in FIG. 3, the terminal apparatus 2 includes a processing section 21 and a storage section 22. The processing section 21 is electrically connected to the components 22 to 25 of the terminal apparatus 2. The processing section 21 includes a CPU (in other words, a processor) and a memory. In the terminal apparatus 2, the CPU executes, using the memory, a program (specifically, a game program) stored in the storage section 22, thereby executing various kinds of information processing. The storage section 22 stores therein programs to be executed in the processing section 21, data to be used for information processing by the processing section 21, data obtained through the information processing, etc. The storage section 22 may be a storage medium incorporated in a main body unit (specifically, a unit in which the processing section 21 is provided) of the terminal apparatus 2, or may be a storage medium (e.g., a card type storage medium) attachable/detachable with respect to the main body unit. The program may be stored in the main body unit by being downloaded from the server 1 to the terminal apparatus 2.

The terminal apparatus 2 includes an input section 23. The input section 23 may be any input device that receives an input performed by the user. In the present embodiment, the input section 23 includes a touch panel provided on a screen of a display section 24 described later. The input section 23 may include buttons and/or an inertial sensor (e.g., an acceleration sensor or a gyro sensor), etc., in addition to (or instead of) the touch panel. The input section 23 may be an input device provided in the main body unit of the terminal apparatus 2, or may be an input device (e.g., a game controller) separated from the main body unit.

The terminal apparatus 2 includes a display section 24. The display section 24 displays an image (e.g., a game image, etc.) that is generated through information processing executed in the processing section 21 of the terminal apparatus 2. The display section 24 may be a display device provided in the main body unit of the terminal apparatus 2, or may be a display device separated from the main body unit. The terminal apparatus 2 may include a speaker, a microphone, and/or a camera, etc.

The terminal apparatus 2 includes a communication section 25. In the present embodiment, the communication section 25 has a function of performing communication while being connected to a mobile communication network (in other words, a mobile telephone communication network). That is, the terminal apparatus 2 (specifically, the processing section 21) is connected to the network 3 by using the communication section 25 (in other words, through the communication section 25) via the mobile communication network, and communicates with other devices (e.g., the server 1, etc.). The configuration of the communication section, through which the terminal apparatus 2 performs communication via the network 3, is arbitrary. For example, the communication section 25 may have a function of connecting to a wireless LAN through a communication module with Wi-Fi authentication, or may have both the function of connecting to the mobile communication network and the function of connecting to the wireless LAN.

2. Outline of Processing in Information Processing System

Hereinafter, the outline of processing to be executed in the information processing system according to the present embodiment will be described. In the present embodiment, a game using game characters (hereinafter referred to simply as "characters") is executed in a game application to be executed in the information processing system. In the present embodiment, a simulation game in which a character regarded as a unit (in other words, a piece) is caused to fight with an enemy character is executed. The characters are game objects, and are, for example, persons who appear in the game. However, the characters are not limited to persons as long as the characters have individuality in setting of the game. For example, animals, weapons, items, and the like may be used as game objects.

In the present embodiment, the game application includes two types of game modes, i.e., a first game and a second game. Each of the first game and the second game is a competitive game in which an ally character as a unit is caused to fight with an enemy character. In the first game, the ally character acts (e.g., moves and/or attacks) according to an instruction of the user during the game. Meanwhile, in the second game, the action of the ally character is controlled by the information processing system during the game. For example, in the present embodiment, in the second game, action turns and action targets of a plurality of ally characters are determined by the information processing system, so that the user need not designate the action turns and the action targets. That is, it can be said that the second game is easier in operation during the game than the first game.

[2-1. First Game]

Figure 4:
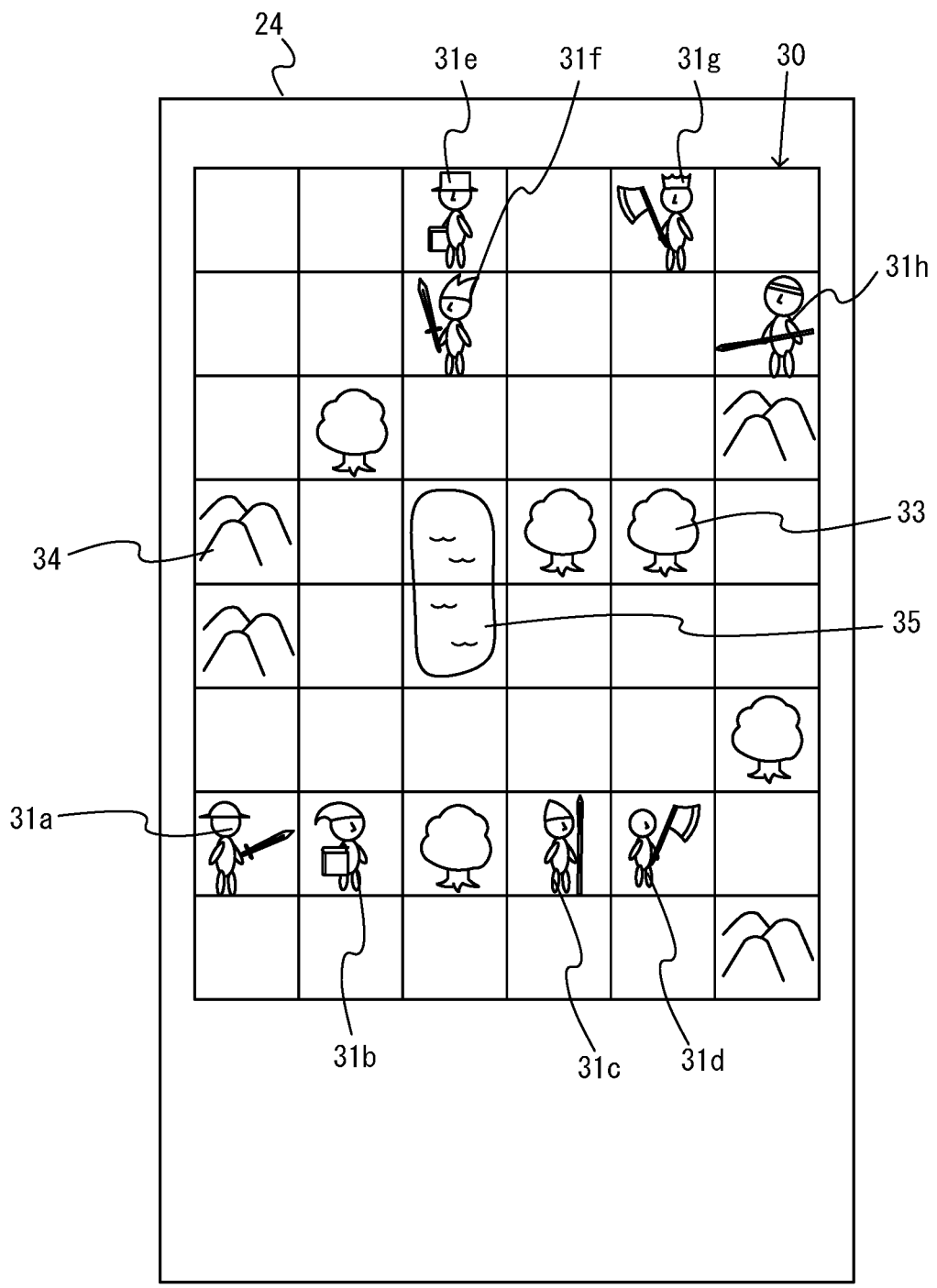
FIG. 4 shows an example of a game image, of a non-limiting first game, displayed during the game.

FIG. 4 shows an example of a game image of the first game displayed during the game. As shown in FIG. 4, in the first game, a game field 30 as an example of a virtual space is displayed on the display section 24 of the terminal apparatus 2. In the present embodiment, the game field 30 in the first game has a size of vertical 8 squares×horizontal 6 squares. In the game field 30, for example, one or more ally characters (in FIG. 4, four ally characters 31a to 31d) and one or more enemy characters (in FIG. 4, four enemy characters 31e to 31h) are placed.

In the first game, from characters possessed by the user, a predetermined number of (e.g., 4 or less) characters are selected by an instruction of the user, and the selected characters are used as the ally characters. In the present embodiment, in the first game, the user cannot use two identical possessed character in one game. That is, in the first game, the user cannot place two identical possessed character in one game field 30.

The possessed characters are characters that can be used in the first game in the game application. When a predetermined giving condition has been satisfied in the application, the information processing system gives a character to the user, thereby causing a state where the user possesses the character (as a possessed character). The condition for giving a possessed character to the user is arbitrary. For example, the information processing system may select a character by random selection that can be performed in exchange for a predetermined item, and may give the selected character to the user. A predetermined character may be given to the user as a reward for achievement of a predetermined goal regarding a game in the application.

In the first game, the information processing system progresses the turn-based competitive game such that an ally turn in which the user operates the ally characters and an enemy turn in which the information processing system operates the enemy characters are alternately repeated. In the ally turn in the first game, the information processing system receives, from the user, an instruction input to move the ally characters 31a to 31d on the game field 30, and an instruction input to cause one of enemy characters located within an attack range of an ally character having been moved to be attacked by this ally character. An attack range of a character (i.e., an ally character or an enemy character) is determined for each character, and is, for example, a range of a square adjacent to the character or a range of two squares away from the character.

As shown in FIG. 4, in the game field 30 in the first game, terrain objects (e.g., tree objects 33, mountain objects 34, a lake object 35, etc.) are placed. The terrain objects restrict movements of some or all types of characters. For example, foot soldier characters cannot get in the lake object 55.

In the first game, in one ally turn, the user can cause a plurality of ally characters to act in a desired order. That is, in the first game, an order in which the ally characters attack the enemy characters and attack targets (i.e., the enemy characters) are designated by the user. When the actions of all the ally characters have ended or a turn end instruction has been made by the user, the one ally turn ends. An enemy turn is started when the ally turn has ended. In the enemy turn, the actions of the enemy characters are controlled by the information processing system. In the present embodiment, the enemy characters are controlled by the information processing system according to a rule determined by the game application. However, in another embodiment, the enemy characters may be operated by another user different from the user who operates the ally characters.

In the first game, the ally turn and the enemy turn are repeatedly executed until an end condition for the game is satisfied. The end condition is arbitrary. For example, the end condition may be that either the ally characters or the enemy characters have been annihilated, that a specific enemy character (e.g., a boss character) has been defeated, or that a predetermined number of turns have passed.

Figure 5:
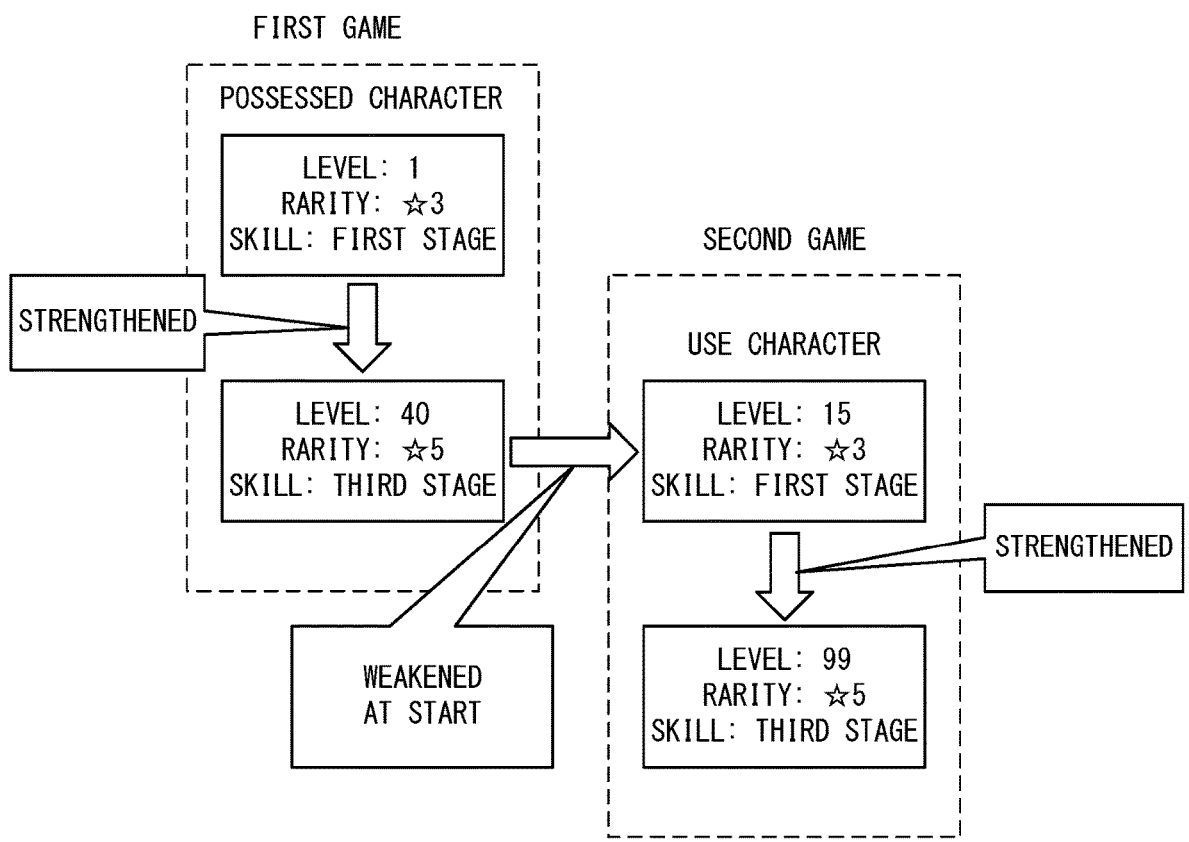
FIG. 5 shows an example of ability changes of a non-limiting possessed character and a non-limiting use character.

FIG. 5 shows an example of ability changes of a possessed character and a use character described later. In the present embodiment, various types of ability parameters (e.g., level, etc.), rarity, skill, and additional strengthening are set on each character as abilities of the character.

The ability parameters are numerical values indicating the strengths of various kinds of abilities of a character, specifically, numerical values indicating the level, maximum physical strength, attack power, defense power, quickness, and the like. The ability parameter may be a value, such as the level, indicating the rough strength of the character itself, or may be a value, such as the maximum physical strength, attack power, or quickness, indicating the individual ability of the character. In the present embodiment, as the level of the character rises, the numerical values indicating the maximum physical strength, attack power, defense power, quickness, and the like increase. Moreover, in the present embodiment, the initial level of each possessed character (i.e., the level when the character is given to the user) is 1. In the first game, based on the ability parameters regarding the individual ability of each character, processes (e.g., damage calculation process) regarding a battle between the character and another character is performed.

The rarity is an index indicating easiness in acquiring a character. In the present embodiment, the higher the rarity of a character is, the more the aforementioned ability parameters increase. For example, even if identical characters have the same level, a character having a higher rarity is higher in the various types of ability parameters (except for the level). Therefore, it can be said that the rarity is a kind of ability. In the present embodiment, the rarity is represented by a numerical value from 3 to 5. The initial rarity of each possessed character is not limited to 3, and may be 4 or 5.

The skill is an ability, of a character, which can influence the progress of the game in various ways. The content of the skill (in other words, the influence that can be exerted by the skill on the progress of the game) is arbitrary, and may be, for example, as follows.

Skill to strengthen a character itself or an ally character (e.g., increase the attack power by 3, etc.).

Skill to weaken an enemy character (e.g., decrease the defense power by 5, etc.).

Skill to enable a character to use a specific ability (e.g., enable the character to use a special attack, increase an amount of movement, or block movement of an enemy character, etc.).

Each character can equip itself with the acquired skill or take off the skill. The skill may be any skill with which some ability is set on a character when the character is equipped with the skill, and may be equipment (e.g., a weapon or an armor) or an item with which the character is to be equipped, on the setting of the game.

In the present embodiment, a plurality of types of skills are prepared, and the plurality of types of skills include skills, of the same category, that exert effects of the same type and of different magnitudes in the game. For example, as for a skill that temporarily increases the attack power of an ally character adjacent to a character with the skill, the plurality of types of skills of the same category are three types of skills including: a first-stage skill having an increment of 3; a second-stage skill having an increment of 5; and a third-stage skill having an increment of 7. In the present embodiment, among the skills of the same category, as for the second or higher stage skill, a character can acquire this skill on condition that the character has already acquired a skill that is lower in stage than this skill. Moreover, whether or not a possessed character has acquired the skill when the character is given to the user, and up to which stage the character has acquired the skill, are determined according to the possessed character or the rarity of the possessed character.

The additional strengthening is an ability of strengthening the ability parameters of a character itself. Specifically, when a possessed character has the ability of additional strengthening, the values of some of the ability parameters (except for the level) of the possessed character are increased. In the present embodiment, any one of a plurality of strengthening stages including 0 stage (i.e., the state having no ability) is set for each character, as the ability of additional strengthening. Each time the strengthening stage increases by 1 stage, the values of some of the ability parameters of the possessed character increase by a predetermined amount (e.g., 1). For example, when the strengthening stage of a certain possessed character increases by 1 stage, each of the maximum physical strength and the attack power increases by 1, and when the strengthening stage further increases by 1 stage, each of the quickness and the defense power increases by 1. The ability parameter to be strengthened with an increase in the strengthening stage by 1 stage is arbitrary. Which ability parameter, of the plurality of types of ability parameters, is to be increased when the ability of additional strengthening increases by 1 stage, may be determined according to the strengthening stage or may be determined according to each character. As described above, in the present embodiment, each time the ability of additional strengthening of each character is strengthened (i.e., each time the strengthening stage increases), the ability parameters of the character are strengthened.

In the present embodiment, a first additional strengthening and a second additional strengthening are set for each character as abilities of additional strengthening. Although details will be described later, the first additional strengthening and the second additional strengthening are different in condition for strengthening the ability (i.e., update condition described later).

In the present embodiment, when a possessed character has satisfied the update condition, the ability of this possessed character is strengthened. Specifically, in the first game, when the possessed character has satisfied a predetermined experience value acquisition condition (e.g., when the possessed character has attacked or defeated an enemy character), the possessed character can acquire an experience value, and the level is raised by 1 according to that the experience value has reached a predetermined value. Furthermore, in the first game, when the possessed character has satisfied a predetermined point acquisition condition (e.g., when the possessed character has attacked or defeated an enemy character), the possessed character can acquire a skill point, and can acquire a skill in exchange for consuming the acquired skill point. In the present embodiment, as for skills of the same category, a skill having the greater effect requires more skill points to be consumed for acquiring the skill. Moreover, in the present embodiment, the user can acquire a predetermined rarity increase item in the game application, and can increase the rarity of the possessed character by 1 in exchange for consuming the rarity increase item. In the present embodiment, the user can possess a plurality of identical characters, and can increase the first additional strengthening of a possessed character by 1 stage in exchange for consuming a possessed character identical to the possessed character. Moreover, the user can acquire a predetermined additional strengthening item in the game application, and can increase the second additional strengthening of a possessed character by 1 stage in exchange for consuming the additional strengthening item.

As described above, the update condition regarding the ability parameters is that the experience value of the possessed character has reached a predetermined value. The update condition regarding the skill is that the skill point of the possessed character is consumed. The update condition regarding the rarity is that the predetermined rarity increase item is consumed. The update condition regarding the first additional strengthening is that the possessed character identical to the possessed character whose ability should be strengthened is consumed. The update condition regarding the second additional strengthening is that the predetermined additional strengthening item is consumed. The specific contents of the update condition are arbitrary. As described above, the update conditions may be the same condition or different conditions depending on the type of the ability of the possessed character (i.e., the ability parameters, rarity, skill, and additional strengthening).

As described above, in the present embodiment, the user can strengthen the ability of a given character (possessed character) by satisfying the update condition for the possessed character. In the present embodiment, an upper limit is set on the ability of the possessed character. Specifically, an upper limit of the level of the possessed character is 40, and an upper limit of the rarity is 5. As for the skill, an upper limit (i.e., the final stage of the skill) is determined according to the type of the skill. An upper limit of the strengthening stages regarding the first additional strengthening is 10 stages. An upper limit of the strengthening stages regarding the second additional strengthening varies depending on the character type. For example, as for an upper limit of the strengthening stages regarding the second additional strengthening, any of 5 stages, 10 stages, and 15 stages is set for each character. The user can strengthen (or grow) the possessed character by playing the first game, and can strengthen the ability of the possessed character up to the upper limit (see FIG. 5). The content of the upper limit of each ability is arbitrary, and is not limited to the above limit.

[2-2. Second Game]

Figure 6:
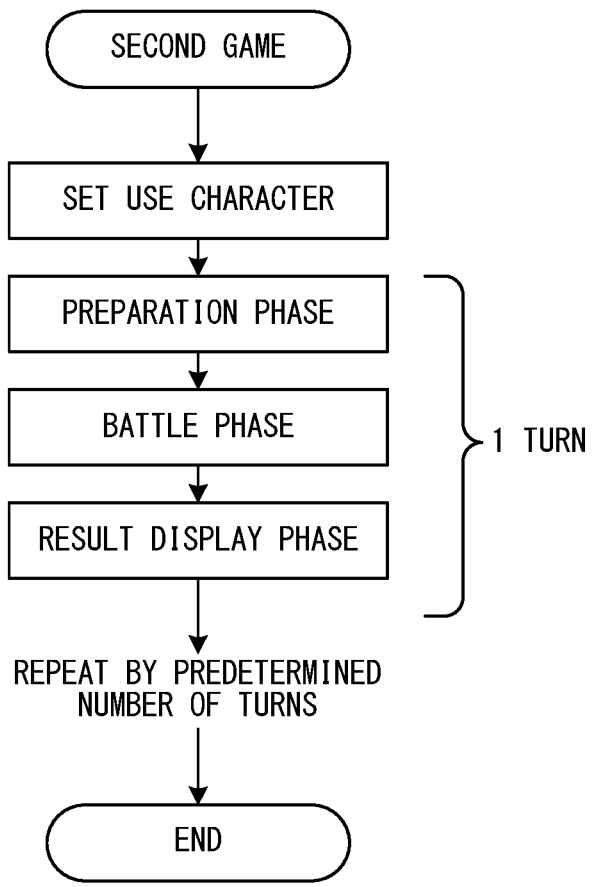
FIG. 6 shows an example of a flow of a non-limiting second game.

Next, the second game to be executed in the game application will be described. FIG. 6 illustrates an example of the flow of the second game. In the second game according to the present embodiment, firstly, a setting process for a use character to be used in the second game is executed. Assuming that one turn consists of a preparation phase, a battle phase, and a result display phase, a plurality of turns are repeatedly executed, thereby progressing the second game. When a predetermined number of turns (e.g., 9 to 12 turns) have been executed, one second game is completed.

[2-2-1. Setting of Use Character]

When the second game has been started, firstly, the information processing system sets the abilities of use characters to be used in the second game. In the present embodiment, one or more characters to be used as the use characters, among the possessed characters, are registered in advance of starting the second game, based on a user instruction, with a predetermined registration number (e.g., 20) being an upper limit. The information processing system stores therein data indicating the registered characters. The information processing system selects, as the use characters, the characters being registered at start of the second game among the possessed characters. Registration of the use characters may be performed at any timing before starting the first turn.

In the present embodiment, the user can also register, in addition to his/her possessed characters, characters possessed by another user as possessed characters to be used as use characters. That is, the information processing system further stores therein ability data indicating the abilities of characters possessed by another user different from the user. The information processing system selects use characters from among the possessed characters of the user and the possessed characters of the other user. This enables the user to play the second game by using the possessed characters of the other user in addition to his/her possessed characters. The other user may be a user registered as a friend of the user, for example.

The information processing system sets the abilities of the respective use characters selected as described above. In the present embodiment, the abilities of the possessed characters in the first game are not applied as they are to the second game, but the abilities of the possessed characters are altered (e.g., weakened) when the abilities of the use characters are set. In the present embodiment, the ability of each use character is set as follows.

In the present embodiment, the information processing system sets a cost for each use character. This cost is a cost for placing the use character in the game field (i.e., a battle area described later) in the second game. Although described in detail later, in the second game, a possession cost is given to the user. By consuming a part of the possession cost, the user can place, in the game field, a use character on which a cost equivalent to the consumed cost is set.

In the present embodiment, the information processing system sets, on each of the use characters, a cost having a value within a predetermined range (e.g., 2 to 8). A specific method of setting a cost on a use character is arbitrary. In the present embodiment, the information processing system assigns the cost values within the predetermined range at random to the respective use characters, thereby setting the costs. At this time, the costs may be set on the use characters such that the number of use characters to which the same cost value is assigned is a fixed number (e.g., the number of use characters on which the cost of 2 is set is a predetermined number). In another embodiment, the costs may be set on the use characters according to a predetermined rule. For example, the costs of the use characters may be set so as to have values according to the levels and/or the rarities of the corresponding possessed characters.

In the present embodiment, the information processing system sets the level of a use character, based on the cost set on the use character. In the present embodiment, the level of a use character is set such that the greater the cost of the use character is, the higher the level of the use character becomes. Specifically, the level of a use character whose cost is 2 is set to 15, and the level increases by 5 each time the cost increases by 1. Thus, in the present embodiment, the level of each use character is set independently from the level of the corresponding possessed character.

In the information processing system, the ability parameters of a use character other than the level are set based on the level of the use character. A specific setting method regarding the ability parameters other than the level is arbitrary. In the present embodiment, the information processing system stores therein, for each character, a table in which the respective ability parameters (except for the level) of the use character are uniquely determined according to the level of the use character. The ability parameters, other than the level, of the use character are determined based on the table.

The information processing system sets the rarity of a use character, based on the level of the use character. In the present embodiment, the rarity of a use character is set such that the higher the level of the use character is, the higher the rarity of the use character becomes. Specifically, the rarity of a use character whose level is lower than 20 is set to 3. The rarity of a use character whose level is equal to or higher than 20 and lower than 30 is set to 4. The rarity of a use character whose level is equal to or higher than 30 is set to 5. Thus, in the present embodiment, the rarity of each use character is set independently from the level of the corresponding possessed character.

The information processing system sets the skill of a use character, based on the ability (specifically, skill) of the corresponding possessed character and on the level of the use character. In the present embodiment, the skill of a use character is set to a skill that is of the same category as the skill equipped by the corresponding possessed character, and that is in a stage according to the level of the use character. Specifically, when the level of a use character is lower than 20, a skill, which is of the same category as the skill equipped by the possessed character and whose skill point required for acquisition thereof is equal to or lower than a first threshold, is set on the use character. When the level of a use character is equal to or higher than 20 and lower than 30, a skill, which is of the same category as the skill equipped by the possessed character and whose skill point required for acquisition thereof is equal to or lower than a second threshold (the second threshold is greater than the first threshold), is set on the use character. When the level of a use character is equal to or higher than 30, the skill equipped by the possessed character is set on the use character (i.e., there is no limitation on the skill point).

For example, a case is considered in which, for example, a possessed character is equipped with the third-stage skill, 80 points are required as skill points for acquiring the first-stage skill, 160 points are required as skill points for acquiring the second-stage skill, the first threshold is 150, and the second threshold is 250. In this example, for a use character whose cost is 2 and whose level is set to 15, a skill that requires skill points less than 150 for acquiring the same, i.e., the first-stage skill, is set. Moreover, in the above example, for a use character whose cost is 4 and whose level is set to 25, a skill that requires skill points equal to or less than 250 for acquiring the same, i.e., the second-stage skill, is set.

In the present embodiment, a skill is classified into one of a plurality of groups. Specifically, there are seven skill groups including a weapon skill group, a support skill group, a secret skill group, an A skill group, a B skill group, a C skill group, and an S skill, and one skill belongs to one of the seven groups. For example, a skill regarding a weapon (e.g., a silver sword, or the like) with which a character is equipped, belongs to the weapon skill group. In addition, for example, a skill that allows a character to use a specific secret technique (in other words, a special attack) when the character is equipped with the skill, belongs to the secrete skill group. In the present embodiment, a character can be simultaneously equipped with one skill per one of the seven groups, that is, seven skills in total. Therefore, the information processing system determines, for each group, a skill to be set on each use character.

The information processing system sets the additional strengthening of a use character, based on the ability (specifically, additional strengthening) of the corresponding possessed character and on the level of the use character. In the present embodiment, the strengthening stage of additional strengthening of a use character is set to the strengthening stage according to the level of the use character, with the strengthening stage of the corresponding possessed character being an upper limit. Specifically, when the level of a use character is equal to or higher than 40, the strengthening stage of first additional strengthening of this use character is set to be the same as the strengthening stage of first additional strengthening of the possessed character. When the level of a use character is lower than 40, the strengthening stage of first additional strengthening of this use character is set to a stage equal to a numerical value obtained by multiplying the strengthening stage of first additional strengthening of the possessed character by "(level of use character)/40" (the digits after the decimal point are rounded down). Meanwhile, a second strengthening stage of the use character is set in the same manner as that for the first strengthening stage. Thus, the strengthening stage of additional strengthening of each use character is set such that the higher the level of the use character is, the higher the strengthening stage becomes, with the strengthening stage of the corresponding possessed character being an upper limit.

As described above, in the present embodiment, as for the skill and the additional strengthening among the abilities of a character, the ability of a use character is set based on the ability of a possessed character. Thus, the ability of the possessed character can be reflected in the use character, whereby motivation to play the first game can be given to the user whose plays the second game.

As described above, in the present embodiment, a use character in the second game may be set so as to have an ability different from that of the corresponding possessed character in the first game. For example, a use character corresponding to a possessed character having the maximum level (i.e., 40) may be set to a level lower than the level of the possessed character (in other words, the use character is weakened as compared to the possessed character) (see FIG. 5).

[2-2-2. Preparation Phase]

When the abilities of the use characters have been set, the information processing system starts a game in the first turn of the second game. In the second game, the use characters whose abilities have been set as described above are used as ally characters. In the present embodiment, the information processing system starts a preparation phase at the beginning of the turn (see FIG. 6). In the preparation phase, the terminal apparatus 2 displays a preparation phase image on the display section 24.

Figure 7:
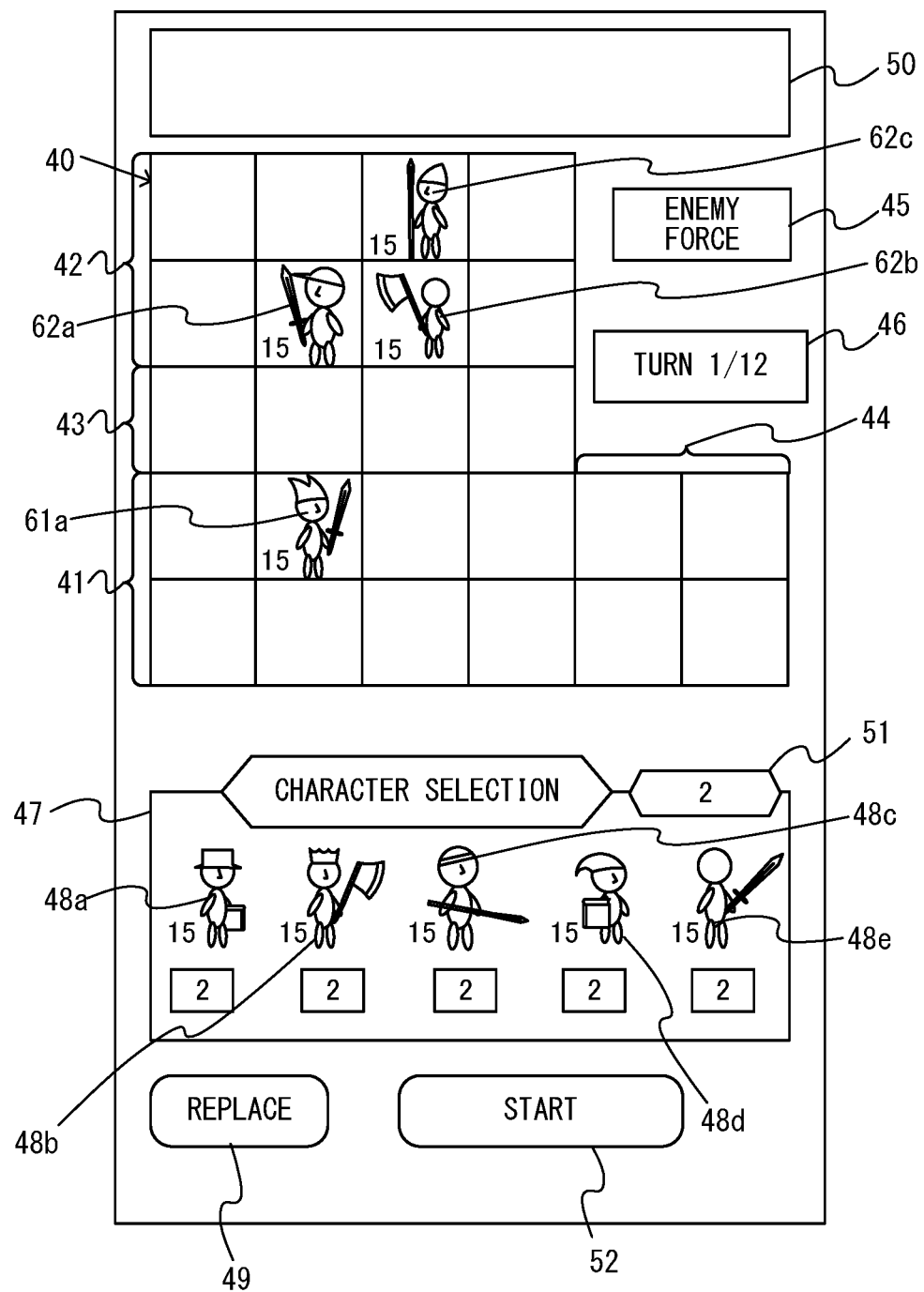
FIG. 7 shows an example of a non-limiting preparation phase image.

FIG. 7 shows an example of the preparation phase image. As shown in FIG. 7, the preparation phase image includes an image of a battle area 40 as a game field in the second game. In the present embodiment, the battle area 40 includes an own army area 41, an enemy army area 42, and an intermediate area 43. The own army area 41 is an area where ally characters can be placed in the preparation phase in the battle area 40. The enemy army area 42 is an area where enemy characters are placed in the battle area 40. The intermediate area 43 is an area between the own army area 41 and the enemy army area 42. In the present embodiment, the battle area 40 has a size of vertical 5 squares×horizontal 4 squares, which is smaller than the game field 30 in the first game. In addition, the preparation phase image includes a waiting area 44 (see FIG. 7), which will be described in detail later.

In the preparation phase, an ally character (ally character 61a in FIG. 7) is placed in the own army area 41, and enemy characters (enemy characters 62a to 62c in FIG. 7) are placed in the enemy army area 42. At start of the preparation phase in the first turn, a predetermined number of ally characters (here, one character) selected at random from among the use characters are placed in the own army area 41. Meanwhile, a predetermined number of enemy characters (here, three characters) set by the information processing system are placed in the enemy army area 42.

The preparation phase image includes an enemy name area 45 and a number-of-turns area 46 (see FIG. 7). The names of enemies are displayed in the enemy name area 45. For example, when a use character of another user is used as an enemy character (details will be described later), the name of the other user is displayed on the enemy name area 45. The total number of turns (12 in FIG. 7) in the current second game, and the current number of turns (1 in FIG. 7) are displayed in the number-of-turns area 46.

As shown in FIG. 7, the preparation phase image includes a candidate presentation area 47. In the candidate presentation area 47, a predetermined number of candidate characters to be presented (five candidate characters 48a to 48e in FIG. 7) selected from among the use characters are placed. The candidate characters are use characters that can be newly placed as ally characters in the battle area 40 (specifically, the own army area 41) in the current turn. That is, the user can designate some of the candidate characters, and place the designated characters as ally characters in the own army area 41. In the present embodiment, the number of candidate characters that are simultaneously placed (in other words, presented) in the candidate presentation area 47 is five, but the number of candidate characters to be presented is not limited. In another embodiment, the number of candidate characters to be presented may be changed (e.g., increased) according to the number of turns.

In the present embodiment, the candidate characters are selected from among the use characters so as to have randomness, based on probability. Here, "selecting so as to have randomness" does not mean randomly selecting in a strict sense, but means selecting based on probability such that the selection results for a plurality of times of selection are not the same. A specific method for selecting candidate characters will be described later (see "[2-2-5. Game in second and subsequent turns]" described later).

As shown in FIG. 7, the preparation phase image includes a replacement instruction image 49. The replacement instruction image 49 is a button image for performing a candidate character replacement instruction. That is, when an input of designating the replacement instruction image 49 (e.g., an input of touching the replacement instruction image 49) has been performed by the user, the information processing system again executes a process of selecting candidate characters from among the use characters, and places the newly selected candidate characters in the candidate presentation area 47. For example, when there is no character that the user wants to designate as an ally character among the candidate characters placed in the candidate presentation area 47, the user may perform the replacement instruction to change the candidate characters.

In the present embodiment, if a second or subsequent replacement instruction has been made in one turn, the information processing system decreases a possession cost described later by only a predetermined amount (e.g., 2). This prevents the user from repeating the replacement instruction freely and frequently.

In the present embodiment, the user designates a desired character from among the plurality of candidate characters in the candidate presentation area 47, and places the character as an ally character in the own army area 41. For example, in the preparation phase image shown in FIG. 7, the information processing system receives, from the user, an instruction input to move any of the candidate characters 48a to 48e to the own army area 41 (e.g., an input of a drag operation performed from the position of the candidate character to the position of the own army area 41).

Figure 8:
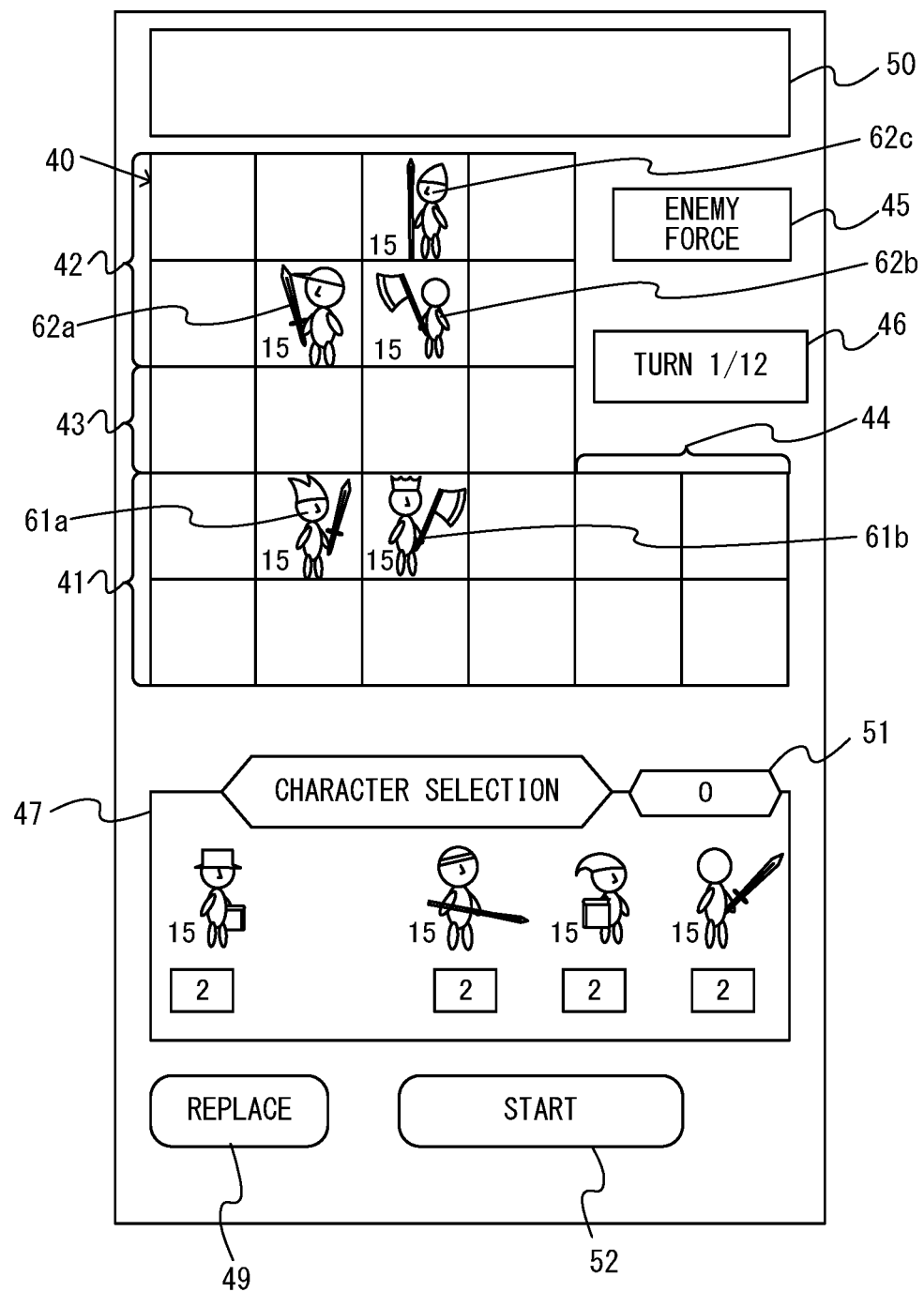
FIG. 8 shows an example of a state where a candidate character has been moved to an own army area from the state shown in FIG. 7.

FIG. 8 shows an example of the state where a candidate character has been moved to the own army area 41 from the state shown in FIG. 7. In FIG. 8, the candidate character 48b shown in FIG. 7 is moved to the own army area 41 and placed as an ally character 61b according to the instruction input of the user. Thus, in the present embodiment, the user can place the character, which is designated by the user from among the candidate characters, as an ally character in the own army area 41.

In the present embodiment, as for the candidate characters in the candidate presentation area 47, the cost ("2" in FIG. 7) and the level ("15" in FIG. 7) of each character are displayed. This allows the user to designate a candidate character to be placed in the own army area 41 while checking the costs and the levels of the candidate characters. In the preparation phase image, as for the ally characters placed in the own army area 41 and the enemy characters placed in the enemy army area 42, the level ("15" in FIG. 7) of each character is displayed.

In the present embodiment, the preparation phase image includes a character detail area 50. Although not shown in FIG. 7, the abilities (i.e., various types of ability parameters, skill, etc.) of a character selected by the user from among the characters displayed in the preparation phase image, are displayed in the character detail area 50. This allows the user to check more specific abilities of each character.

As shown in FIG. 7, the preparation phase image includes a possession cost area 51. In the possession cost area 51, a numerical value indicating the cost (possession cost) currently possessed by the user is displayed. In the present embodiment, in the second game, a predetermined amount of possession cost is given to the user. Although described in detail later, in the present embodiment, the possession cost is given to the user for each turn. The user can place a candidate character as an ally character in the own army area 41 in exchange for consuming the possession cost. Specifically, when a candidate character is moved to the own army area 41 according to an instruction input made by the user, the information processing system decreases the possession cost of the user by the amount of the cost of the candidate character. For example, in the example shown in FIG. 7 and FIG. 8, since a candidate character whose cost is 2 is placed as an ally character in the own army area 41, the numerical value shown in the possession cost area 51 changes from "2" to "0". If the cost of the candidate character is greater than the possession cost, the information processing system inhibits movement of the candidate character to the own army area 41 (e.g., avoids reception of the instruction input).

In another embodiment, the information processing system may display the total amount of cost given to the user and the total amount of cost consumed by the user, instead of displaying the possession cost. In this case, a value obtained by subtracting the total amount of cost consumed by the user (referred to as "total amount of consumption cost") from the total amount of cost given to the user (referred to as total amount of given cost") corresponds to the possession cost. Therefore, when the information processing system stores therein the total amount of given cost, "decreasing the possession cost" is equivalent to increasing the total amount of consumption cost by the amount of the cost of the candidate character placed as an ally character.

Similarly to the own army area 41, the waiting area 44 is an area where an ally character can be placed. The waiting area 44 is an area where an ally character not to be involved in the battle in the current turn is placed. In the battle phase described later, the ally character placed in the own army area 41 battles with the enemy characters, while the ally character placed in the waiting area 44 does not battle with the enemy characters. The user can place, in the waiting area 44, an ally character that is not involved in the battle in the current turn but is planned to be involved in the battle in a later turn.

In the present embodiment, a candidate character in the candidate presentation area 47 can be moved as an ally character to the waiting area 44 as well as to the own army area 41. Also when the candidate character is placed as an ally character in the waiting area 44, the possession cost is consumed as in the case of placing the same in the own army area 41.

In the present embodiment, in the preparation phase, the user can change the placement position of a use character in the own army area 41 or the waiting area 44. That is, the information processing system receives, from the user, an instruction input to change the placement position of an ally character in the own army area 41 or the waiting area 44 (e.g., an input of a drag operation performed from the position of the ally character to the position of a destination). Although described in detail later, in the present embodiment, depending on the positions of ally characters in the own army area 41, an attack turn and an attack target of each ally character against an enemy character vary, and moreover, an attack target of an attack on an ally character by an enemy character also varies. Therefore, the user changes the positions of the ally characters in the own army area 41 so as to place them as desired, or moves the ally characters between the own army area 41 and the waiting area 44.

As described above, in the present embodiment, the information processing system changes the placement of an ally character in the own army area in advance of the battle phase, according to an instruction of the user. Thus, the user can change the placement of the ally character so as to be advantageous to the user in the battle phase, thereby improving the strategic characteristics of the second game.

In the present embodiment, in the preparation phase, the user can also delete an ally character placed in the own army area 41 or the waiting area 44. That is, the information processing system receives, from the user, an instruction input to delete an ally character in the own army area 41 or the waiting area 44. When the ally character has been deleted, the information processing system may increase the possession cost of the user according to the cost of the ally character. For example, in the above case, the possession cost may be increased by the amount of the cost of the ally character or by half the amount of the cost.

As shown in FIG. 7, the preparation phase image includes a start instruction image 52. The start instruction image 52 is a button image for performing a battle start instruction to end the preparation phase and start the battle phase. That is, when an input of designating the start instruction image 52 is performed by the user, the information processing system ends the preparation phase and starts the battle phase (see FIG. 6).

As described above, in the present embodiment, within the turn (more specifically, within the preparation phase), from among a first number of characters (more specifically, the aforementioned number of characters registered) designated by the user before start of the second game, the information processing system places a second number, which is smaller than the first number, of characters (more specifically, the aforementioned number of characters to be presented) as a plurality of candidate characters, in the candidate presentation area 47. Thus, in the present embodiment, the user can set the characters (i.e., use characters) that can be ally characters, in advance of starting the second game. Since strategic characteristics are generated as to how to set the characters that can be ally characters, it is possible to improve the strategic characteristics of the second game.

[2-2-3. Battle Phase]

In the present embodiment, when the battle phase is started, the information processing system determines attack turns of the ally characters and the enemy characters placed in the battle area 40. In the following description, the ally characters and the enemy characters placed in the battle area 40 may be collectively referred to as "placed characters".

In the present embodiment, the attack turns of the placed characters are determined based on a plurality of decision criteria. Specifically, in the present embodiment, first to fifth criteria described below are used as the decision criteria.

The first criterion is whether a character is placed in an advance-guard area or a rear-guard area. In the present embodiment, each of the own army area 41 and the enemy army area 42 can be divided into an advance-guard area and a rear-guard area. The advance-guard area in the own army area 41 is an area on a side close to the enemy army area 42 (i.e., an area corresponding to the second row from the bottom of the battle area 40). The rear-guard area in the own army area 41 is an area on a side far from the enemy army area 42 (i.e., an area corresponding to the lowermost row in the battle area 40). The advance-guard area in the enemy army area 42 is an area on a side close to the own army area 41 (i.e., an area corresponding to the second row from the top of the battle area 40). The rear-guard area in the enemy army area 42 is an area on a side far from the own army area 41 (i.e., an area corresponding to the uppermost row in the battle area 40).

In the present embodiment, the attack turn of a character placed in the advance-guard area is determined to be earlier than the attack turn of a character placed in the rear-guard area. For example, in the example shown in FIG. 8, the attack turns of the characters 61a, 61b, 62a, and 62b placed in the advance-guard areas are earlier than the attack turn of a character 62c placed in the rear-guard area.

As described above, in the present embodiment, the information processing system determines the attack turns of the placed characters, based on whether the characters are placed in the advance-guard area or the rear-guard area. Thus, for example, the user plays the second game while considering arrangement of the placed characters in the battle area in order to make the attack turns of the characters placed in the battle phase be in his/her desired order. Thus, since the arrangement of the placed characters has an influence on the progress and result of the second game, it is possible to improve the strategic characteristics of the second game.

In the present embodiment, the attack turns are determined while giving the highest priority to the first criterion. Specifically, the information processing system sets the attack turns of the placed characters in the advance-guard area to be earlier than the attack turns of the placed characters in the rear-guard area. This allows the user to easily understand the attack turns of the placed characters based on whether the characters are placed in the advance-guard area or the rear-guard area. Thus, the user can easily plan a strategy regarding the arrangement of the ally characters.

In another embodiment, in the case where the attack turns of the placed characters are determined based on whether the characters are placed in the advance-guard area or the rear-guard area, the information processing system may not necessarily determine the attack turns such that the attack turn of the character placed in the advance-guard area is earlier than the attack turn of the character placed in the rear-guard area. For example, the information processing system may calculate provisional attack turns based on whether the characters are placed in the advance-guard area or the rear-guard area, and may correct the provisional attack turns based on another decision criterion to determine final attack turns.

If not all the attack turns of the placed characters can be determined based on the first criterion (e.g., if a plurality of characters are placed in the advance-guard area), the information processing system determines the attack turns based on a second criterion. The second criterion is a criterion regarding the levels of the placed characters. Specifically, as for a plurality of placed characters whose attack turns cannot be determined based on the first criterion, the information processing system determines the attack turns of these placed characters in descending order of the levels.

If not all the attack turns of the placed characters can be determined based on the first criterion and the second criterion (e.g., if a plurality of characters of the same level are placed in the advance-guard area), the information processing system determines the attack turns based on a third criterion. The third criterion is a criterion regarding the quickness which is one of the ability parameters of the placed characters. Specifically, as for a plurality of placed characters whose attack turns cannot be determined based on the first criterion and the second criterion, the information processing system determines the attack turns of these placed characters in descending order of the quickness which is an ability parameter.

As described above, in the present embodiment, the information processing system determines the attack turn of each placed character, based on the ability parameters (e.g., the level as the second criterion, and/or the parameter of quickness as the third criterion) associated with the placed character. Thus, the attack turn of each placed character is determined in consideration of the ability parameters of the character in addition to the position of the character in the battle area, which means that the attack turn is determined based on more factors. Thus, the strategic characteristics of the second game can be further improved. Although described in detail later, in the present embodiment, the ability (including the level and the quickness) of each placed character can be strengthened during the second game. Therefore, progressing the game so as to strengthen the abilities of the placed characters during the second game also has an influence on the attack turns, whereby the strategic characteristics of the second game can be further improved.

If not all the attack turns of the placed characters can be determined based on the first to third criteria (e.g., if a plurality of characters having the same level and quickness are placed in the advance-guard area), the information processing system determines the attack turns based on a fourth criterion. The fourth criterion is whether a placed character is an ally character or an enemy character. Specifically, as for a plurality of placed characters whose attack turns cannot be determined based on the first to third criteria, the information processing system sets the attack turn of an ally character to be earlier than the attack turn of an enemy character. In another embodiment, as for the plurality of placed characters whose attack turns cannot be determined based on the first to third criteria, the attack turn of an enemy character may be earlier than the attack turn of an ally character.

If not all the attack turns of the placed characters can be determined based on the first to fourth criteria (e.g., if a plurality of ally characters having the same level and quickness are placed in the advance-guard area), the information processing system determines the attack turns based on a fifth criterion. The fifth criterion is that a character is placed more to the left side. Specifically, as for a plurality of placed characters whose attack turns cannot be determined based on the first to fourth criteria, the information processing system determines the attack turns such that the attack turn of a character placed more to the left side is earlier than the attack turns of other characters. That is, as for the plurality of placed characters whose attack turns cannot be determined based on the first to fourth criteria, the attack turns are determined in order from the most-left character. For example, in the example shown in FIG. 8, if the ally characters 61a and 61b have the same level and quickness, the attack turn of the ally character 61a is determined to be earlier than the attack turn of the ally character 61b according to the fifth criterion. The "left side" is the left side when a direction, in which a character placed in one of the own army area and the enemy army area faces the other area, is a forward direction. That is, as for the enemy characters, the attack turn of an enemy character placed more to the right side is earlier than the attack turns of other characters on the display screen.

In the present embodiment, even if not all the attack turns of the placed characters can be determined based on the first to third criteria, the attack turns of the respective placed characters can be uniquely determined based on the fourth and fifth criteria.

In the present embodiment, the attack turns of the placed characters are determined by using the aforementioned five decision criteria. However, the attack turn determination method is arbitrary. For example, in another embodiment, another decision criterion different from the above decision criteria may be used, or some of the above decision criteria may not necessarily be used. Moreover, in the present embodiment, the five decision criteria are given priority levels, and the information processing system uses the decision criterion of the lower priority level when the information processing system cannot determine the attack turns by using the decision criterion of the higher priority level. In another embodiment, the information processing system may calculate provisional attack turns for each decision criterion, and may calculate final attack turns, based on a plurality of provisional attack turns calculated (e.g., in descending order of an average value of the provisional attack turns).

Moreover, the information processing system determines an attack target of each placed character. That is, as for an ally character, a character to be a target character (i.e., to be attacked by the ally character) is determined from among the enemy characters. As for an enemy character, a character to be an attack target (i.e., to be attacked by the enemy character) is determined from among the ally characters.

In the present embodiment, an attack target of each placed character is determined based on a plurality of decision criteria. Specifically, in the present embodiment, first to fourth criteria described below are used as the decision criteria.

The first criterion is a difference between positions in the horizontal direction in the battle area 40. That is, the information processing system determines, as an attack target, an opponent character having a smallest positional difference in the horizontal direction with respect to a placed character to be an attacker. The opponent character is an enemy character when the attacker is an ally character, or an ally character when the attacker is an enemy character. For example, in the battle area 40, when there is an opponent character placed in the same column as a placed character as an attacker, this opponent character, the aforementioned difference of which is 0, becomes an attack target. Meanwhile, for example, when, in the battle area 40, there is no opponent character placed in the same column as the placed character as the attacker and there is an opponent character placed in a column adjacent to the above column, this opponent character, the difference of which is 1, becomes an attack target.

As described above, in the present embodiment, assuming that the direction from the own army area to the enemy army area (i.e., the up-down direction) is the forward direction in the game image, the information processing system determines an attack target of an ally character placed in the own army area such that an enemy character placed in a position closer to the ally character in the forward direction (i.e., a position at which the difference is smaller) is given a higher priority than an enemy character placed in a position farther from the ally character in the forward direction (i.e., a position at which the difference is larger). In this case, the user plays the second game while considering arrangement of the placed characters so as to make a desired enemy character become an attack target of an ally character in the battle phase. Thus, in the present embodiment, the strategic characteristics of the second game can be improved by determining an attack target based on arrangement of the placed characters.

In the case where an attack target is determined such that an opponent character placed in a position where the difference is smaller is given a higher priority than an opponent character placed in a position where the difference is larger, in another embodiment, the information processing system may not necessarily determine an opponent character placed in a position where the difference is smallest to be an attack target. For example, the information processing system may calculate the priority level based on the difference and may further calculate the priority level based on another decision criterion to determine a final attack target based on these priority levels.

In the present embodiment, in the battle area 40, the own army area 41 and the enemy army area 42 are arranged in the up-down direction, and the first criterion is applied based on a positional difference, in the left-right direction, of the respective placed characters. In another embodiment, in the battle area 40, the own army area 41 and the enemy army area 42 may be arranged side by side in the left-right direction, and the first criterion may be applied based on a positional difference, in the up-down direction, of the respective placed characters.

In a case where an attack target cannot be determined based on the first criterion, the information processing system determines an attack target based on a second criterion. Examples of the above case may include: a case where opponent characters are placed in both the advance-guard area and the rear-guard area in the same column where a placed character as an attacker is placed; and a case where no opponent character is placed in an column where a character as an attacker is placed while opponent characters are placed in both a column adjacent to the left side of the column where the attacker is placed and a column adjacent to the right side of the column.

The second criterion is whether an opponent character is placed in the advance-guard area or the rear-guard area. Specifically, when there are a plurality of opponent characters that can be attack targets in determination based on the first criterion, the information processing system determines, as an attack target, an opponent character placed in the advance-guard area (or an opponent character placed in a position closest to the placed character as the attacker) among the plurality of opponent characters. For example, in the example shown in FIG. 8, when the ally character 61b is an attacker, candidates for an attack target are narrowed down to the enemy characters 62b and 62c in determination based on the first criterion, and the enemy character 62b is determined as an attack target based on the second criterion.

As described above, when the second criterion is used, the user plays the second game while considering arrangement of the placed characters so as to make a desired ally character become an attack target of an enemy character in the battle phase. Thus, the strategic characteristics of the second game can be improved.

In a case where an attack target cannot be determined based on the first criterion and the second criterion, the information processing system determines an attack target based on a third criterion. The above case is, for example, a case where no opponent character is placed in a column where a character as an attacker is placed while opponent characters are placed in the advance-guard area in both a column adjacent to the left side of the column and a column adjacent to the right side of the column.

The third criterion is that an affinity is advantageous to a placed character as an attacker. In the present embodiment, one of a plurality of (e.g., four) types of attributes is set on each character. As for some of combinations of an attribute and another attribute, it is set that one of the attributes is advantageous to the other attribute. Specifically, in the present embodiment, one attribute among the four types of attributes, i.e., a read attribute, a blue attribute, a green attribute, and a colorless attribute, is set on each character. Moreover, advantage/disadvantage relationship regarding an affinity is set such that the red attribute is advantageous to the green attribute, the blue attribute is advantageous to the red attribute, and the green attribute is advantageous to the blue attribute. The colorless attribute is neither advantageous nor disadvantages with respect to any of the other three attributes. In the first game and the second game, when the attribute of a placed character is advantageous to the attribute of an opponent character, damage (i.e., an amount of decrease in life parameter) due to an attack is increased as compared to a case where there is no advantage/disadvantage between the attributes of the characters. Meanwhile, in the first game and the second game, when the attribute of a placed character is disadvantageous to the attribute of an opponent character, damage due to an attack is decreased as compared to the case where there is no advantage/disadvantage between the attributes of the characters.

Specifically, if there are a plurality of opponent characters that can be attack targets in determination based on the first criterion and the second criterion, the information processing system determines, as an attack target, an opponent character having an attribute of affinity that is disadvantageous to a placed character as an attacker (i.e., that makes the attribute of the placed character as the attacker advantageous) among the plurality of opponent characters. In another embodiment, if there is no opponent character, among the plurality of opponent characters, which is disadvantageous to the attribute of the placed character as the attacker, an opponent character having an attribute of affinity that is neither advantageous nor disadvantageous to the attribute of the placed character as the attacker, may be determined as an attack target.

As described above, when the third criterion is used, the user plays the second game while considering the attributes of the placed characters so as to make a desired enemy character become an attack target of an ally character in the battle phase. Thus, the strategic characteristics of the second game can be improved.

In a case where an attack target cannot be determined based on the first to third criteria, the information processing system determines an attack target based on a fourth criterion. The above case is, for example, a case where no opponent character is placed in a column where a character as an attacker is placed, and there is no opponent character having an attribute of affinity that is disadvantageous to the attribute of the placed character as the attacker in the advance-guard area in both a column adjacent to the left side of the column and a column adjacent to the right side of the column.

The fourth criterion is that an opponent character is placed more to the left side. Specifically, when there are a plurality of opponent characters that can be attack targets in determination based on the first to third criteria, the information processing system determines, as an attack target, an opponent character that is placed on the left side among the plurality of opponent characters. The "left side" is the left side when a direction, which is directed from an area where a character as an attacker is placed to an area where an opponent character is placed, is a forward direction. That is, for an enemy character, an ally character, which is placed on the right side among the plurality of ally characters, is an attack target on the display screen. In the present embodiment, even if an attack target cannot be determined based on the first to third criteria, it is possible to uniquely determine an attack target by using the fourth criterion.

In the present embodiment, an attack target of a placed character is determined by using the aforementioned four decision criteria. However, the attack target determination method is arbitrary. For example, in another embodiment, another decision criterion different from the above decision criteria may be used, or some of the above decision criteria may not necessarily be used. Moreover, in the present embodiment, the four decision criteria are given priority levels, and the information processing system uses the decision criterion of the lower priority level when the information processing system cannot determine an attack target by using the decision criterion of the higher priority level. In another embodiment, the information processing system may calculate a provisional attack target for each decision criterion, and may calculate a final attack target, based on a plurality of provisional attack targets calculated (e.g., a placed character, which has become a provisional attack target for most decision criteria, is determined as an attack target).

As described above, in the present embodiment, the attack turn and the attack target of each placed character are determined according to the aforementioned decision criteria. In the present embodiment, since the attack turn and the attack target of each placed character are not determined at random, the user can consider arrangement of characters to be placed in the battle area while expecting the attack turn and the attack target before starting the battle phase. Thus, the strategic characteristics of the second game can be improved.

Figure 9:
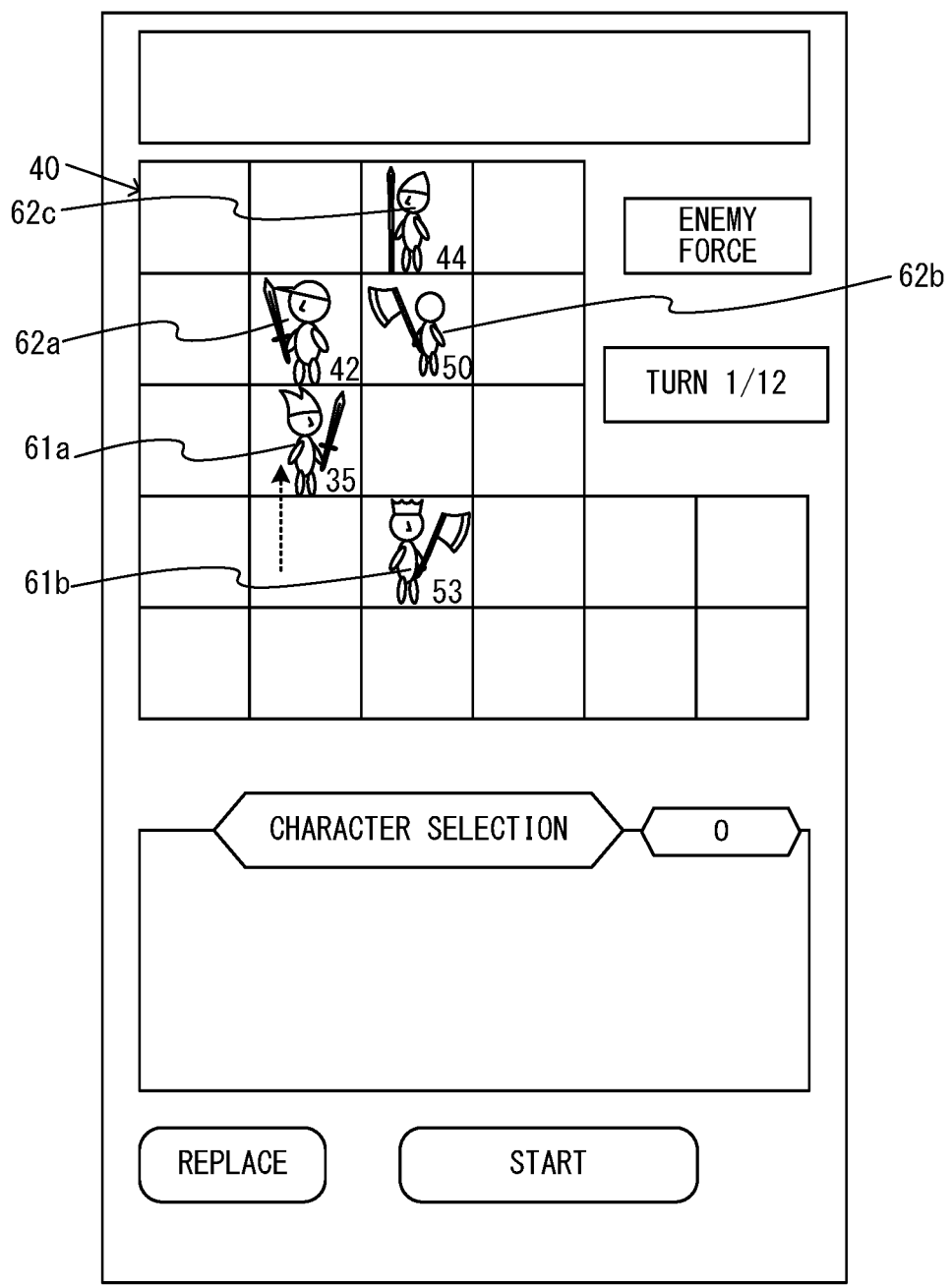
FIG. 9 shows an example of a non-limiting battle phase image.

In the battle phase, the information processing system causes each placed character to perform an attack on the attack target determined as described above, in the attack turn determined as described above. FIG. 9 shows an example of a battle phase image that is a game image displayed in the battle phase of the second game. FIG. 9 shows an example of a battle phase image when a placed character perform an attack. As shown in FIG. 9, the battle area 40 is displayed on the display section 24 also in the battle phase as in the preparation phase.

In the present embodiment, when a placed character performs an attack on an attack target, the information processing system moves the placed character to a position where the placed character can attack the attack target as shown in FIG. 9. Specifically, as for an ally character whose attack range is a square adjacent to itself, the information processing system moves this ally character to a square right below an enemy character to be an attack target. As for an ally character whose attack range is two squares from itself, the information processing system moves this ally character to a square two squares right below the enemy character to be the attack target. Moreover, as for an enemy character whose attack range is a square adjacent to itself, the information processing system moves an ally character to be an attack target to a square right above this enemy character. As for an enemy character whose attack range is two squares from itself, the information processing system moves this enemy character to a square two squares right above the ally character to be the attack target. In the example shown in FIG. 9, the ally character 61a, whose attack range is a square adjacent to itself, attacks the enemy character 62a, and the ally character 61a moves to a square right below the enemy character 62a as an attack target, and performs an attack. When the attack has ended, the placed character having performed the attack is returned to the original position.

In a case where a placed character moves in order to perform an attack, if another placed character is present in the destination position, the information processing system interchanges the positions of the placed character to perform an attack and the other placed character present in the destination position. When the attack has ended, the two placed characters are returned to their original positions.

As described above, in the present embodiment, when an attack target is not present in an attack range of a placed character in the battle area, the information processing system moves the placed character such that the attack target is included in the attack range, and causes the placed character to perform an attack on the attack target. This allows the user to easily recognize the placed character to be the attacker and the placed character to be the attack target.

In the present embodiment, the intermediate area 43 is provided between the own army area 41 and the enemy army area 42 (see FIG. 9). Therefore, a placed character as an attacker may move to the intermediate area 43 where no placed character is basically placed, and perform an attack, thereby reducing the opportunities of interchanging the positions of the placed character that performs an attack and the other placed character present in the destination position. This allows the user to more easily understand movement of a placed character at the time when the character performs an attack.

In the present embodiment, the terrain objects used in the first game are not placed in the battle area in the second game, so that a placed character is prevented from being restricted in movement when performing an attack, and from becoming incapable of the attack. However, in another embodiment, the terrain objects may be placed in the battle area in the second game.

In the present embodiment, in the second game, game processing at the time of an attack is performed similarly to the first game. The "game processing at the time of an attack" is, specifically, calculating an amount of damage due to the attack, and decreasing the life parameter of a placed character as an attack target according to the amount of damage. Specifically, the information processing system executes the following processing at the time of an attack.

In a case where a placed character as an attacker performs an attack on a placed character as an attack target, if a counterattack condition has been satisfied, the information processing system causes the placed character as the attack target to perform a counterattack on the placed character as the attacker. When the counterattack is performed, calculation of the amount of damage is also performed for the placed character as the attacker, and the physical strength of the placed character is decreased. The specific content of the counterattack condition is arbitrary. In the present embodiment, the counterattack condition is that the attack range of the placed character as the attacker is equal to the attack range of the placed character as the attack target, or that the placed character as the attack target is equipped with a predetermined skill that enables the character to perform a counterattack regardless of the attack range.

As described above, in the present embodiment, in a case where a first placed character attacks a second placed character as an attack target according to an attack turn, if the counterattack condition has been satisfied, the information processing system decreases the life parameter associated with the first placed character according to the counterattack performed on the first placed character by the second placed character, regardless of the attack turn of the second placed character. In this case, the user considers placement of the ally character in the own army area 41 while also considering influence of a counterattack by the placed character as the attack target. Thus, in the present embodiment, since the attack target is allowed to perform a counterattack, the strategic characteristics of the second game can be further improved.

In a case where a placed character as an attacker performs an attack on a placed character as an attack target, the information processing system considers influence of the skill of each placed character. For example, in a case where an ally character attacks an enemy character, an example is considered in which another ally character is equipped with a skill of "increasing by 3 the attack power of an ally character within a range of two squares around". In this example, the information processing system increases by 3 the attack power of the ally character as the attacker and calculates an amount of damage, on condition that the ally character as the attacker is present within the range of two squares around the other ally character. In a case where the skill of each placed character is a skill that activates an effect on the condition of positional relationship between a placed character equipped with a skill and a placed character influenced by the skill, in the present embodiment, activation of the skill effect is determined based on a position to which the placed character as the attacker has moved for performing an attack. However, in another embodiment, activation of the skill effect may be determined based on a position from which the character as the attacker has moved.

As described above, in the present embodiment, when a character having a predetermined ability (specifically, skill) is placed in the battle area, the information processing system causes the ability parameters associated with some placed characters according to the predetermined ability, among other placed characters different from the placed character, to be changed according to the predetermined ability in the current turn. When the placed character with which the changed ability parameter is associated performs an attack and/or becomes an attack target, the information processing system decreases the life parameter associated with the placed character to be the attack target, based on the changed ability parameter.

The "some placed characters according to the predetermined ability" means, for example, if an ally character has a skill of "increasing by 3 the attack power of an ally character within a range of two squares around", other ally characters placed within the range of two squares around this ally character. The predetermined ability is not limited to an ability that has an influence on a placed character to be an ally for the placed character having the ability, and may be an ability that has an influence on a placed character to be an enemy to the placed character having the ability (e.g., that decreases the ability parameter of the placed character to be the enemy).

As described above, the life parameter is calculated in consideration of the abilities of the other placed characters in addition to the abilities of the placed character as the attacker and the placed character as the attack target. Thus, the strategic characteristics of the second game can be improved. Moreover, if the skill possessed by a placed character exerts an effect depending on the positional relationship between this placed character and another placed character in the battle area, the user plays the second game while considering arrangement of the placed characters in the battle area. Therefore, in the above case, the strategic characteristics of the second game can be further improved.

A timing at which the ability parameter of the placed character is changed according to the skill may be: when the battle phase is started; when the placed character whose ability parameter is to be changed performs an attack (specifically, immediately before the attack); or after the placed character having the skill performed an attack. If the ability parameter is changed at start of the battle phase, the aforementioned attack turn may be determined based on the changed ability parameter (specifically, quickness).

In a case where a placed character as an attacker performs an attack on a placed character as an attack target, the information processing system considers an affinity of the attributes of these placed characters. That is, as described above, when the attribute of the placed character as the attacker is advantageous to the attribute of the opponent character as the attack target, the information processing system increases the damage due to the attack as compared to the case where there is no advantage/disadvantage between the attributes of the characters. Meanwhile, when the attribute of the placed character as the attacker is disadvantageous to the attribute of the opponent character as the attack target, the information processing system decreases the damage due to the attack as compared to the case where there is no advantage/disadvantage between the attributes of the characters.

As described above, in the present embodiment, at least one of a plurality of types of attributes is set on each character to be an ally character or an enemy character, and at least one of the plurality of types of attributes has an affinity with at least one of the other attributes. The information processing system, according to the affinity between the attribute of the placed character that performs an attack and the attribute of the placed character that becomes an attack target, changes the amount of decrease, due to the attack, in the life parameter associated with the placed character as the attack target. Thus, calculation of the life parameter is performed also considering the affinity between the placed character as the attacker and the placed character as the attack target, whereby the strategic characteristics of the second game can be further improved.

In a case where a placed character as an attacker performs an attack on a placed character as an attack target, if the ability parameter of quickness of these placed characters satisfies a certain condition, the information processing system allows two attacks. In the present embodiment, for example, on condition that a difference in quickness between the placed characters is equal to or greater than a predetermined value (e.g., 5), the placed character having the higher ability parameter of quickness can perform two attacks (or counterattacks) on the placed character having the lower ability parameter of quickness.

As described above, in the present embodiment, the information processing system determines, for each placed character, an attack turn and the number of attacks based on the parameter that indicates quickness and is associated with the placed character. Thus, one ability parameter of the placed character has an influence not only on the attack turn bus also on the number of attacks, whereby the strategic characteristics of the second game can be further improved.

In the present embodiment, the aforementioned features (specifically, an attack target performing a counterattack, the skill of another placed character being considered, an affinity of attributes being considered, and two attacks being performed according to quickness) are common to the first game and the second game. Therefore, a user who has played the first game can easily image a battle in the second game, which makes the second game easily understandable for the user.

In the battle phase, an attack on an attack target is performed for each placed character, and the information processing system decreases the life parameter of the placed character (specifically, a placed character as an attack target, or a placed character as an attacker when a counterattack is performed) each time an attack is performed. In the present embodiment, the information processing system removes, from the battle area 40, a placed character, the value of the life parameter of which has become 0 as a result of the decrease in the life parameter.

In the present embodiment, in the preparation phase, each placed character and an ability parameter (specifically, level) of the placed character are displayed (see FIG. 8). Meanwhile, in the battle phase, each placed character and a life parameter of the placed character are displayed (for example, in FIG. 9, the ally character 61a is displayed together with a value "35" indicating the current life parameter thereof). Specifically, in the present embodiment, in the preparation phase, each placed character and a numerical value indicating the level of the placed character (e.g., a numerical value "15" shown in FIG. 8) are displayed. Meanwhile, in the battle phase, each placed character and, instead of the above numerical value, a numerical value indicating the current life parameter of the placed character are displayed. Thus, the ability of each placed character can be presented to the user in the preparation phase, and the state of each placed character can be presented to the user in the battle phase. Therefore, appropriate information according to each phase can be presented to the user, thereby improving the convenience of the user.

As described above, in the present embodiment, attack turns are set for all the characters placed in the battle area 40. However, a placed character, which has been removed from the battle area 40 before its attack turn comes, does not perform an attack. The information processing system ends the battle phase according to that all the placed characters present in the battle area 40 have finished attacks.

As described above, in the present embodiment, in the battle phase, the attack turns and the attack targets of the placed characters are determined by the information processing system, and therefore, the user need not perform a game operation for the determination. Therefore, in the second game, the user can play the game with a simpler game operation than in the first game.

In the present embodiment, in the battle phase, the information processing system progresses the game automatically (i.e., without an input by the user). However, in another embodiment, the information processing system may receive, from the user, an instruction input to temporarily stop the game progress in the battle phase, and an instruction input to restart the temporarily stopped game progress.

[2-2-4. Result Display Phase]

In the present embodiment, when the battle phase has ended, the result display phase is started (see FIG. 6). In the result display phase, the terminal apparatus 2 displays a game result in the current turn on the display section 24. In the present embodiment, as the game result, a win/loss result of the game (i.e., the battle game in the battle phase) in the current turn, and the score of the user are displayed.

In the present embodiment, the win/loss result of the game is determined based on the life parameters of the respective ally characters and the life parameters of the respective enemy characters. Specifically, the information processing system calculates a total value of the life parameters of the ally characters at the end of the game in the current turn (i.e., the remaining physical strengths after the battle game), and a total value of the life parameters of the enemy characters at the end of the game. Then, the information processing system determines that the user wins when the former is larger than the latter, and determines that the user loses when the former is smaller than the latter.

The game win/loss determination method is arbitrary, and is not limited to the method based on the life parameters of the respective placed characters as in the present embodiment. For example, in another embodiment, the game win/loss determination method may be a method based on the number of ally characters and the number of enemy characters, which are placed at the end of the game, or a method based on a comparison between a total value of damages that the ally characters have caused to the enemy characters, and a total value of damages that the enemy characters have caused to the ally characters.

In the present embodiment, the score of the user is determined based on the life parameters of the respective ally characters and the life parameters of the respective enemy characters. Specifically, the information processing system calculates the score, based on a value obtained by subtracting a total value of the life parameters of the enemy characters at the end of the game from a total value of the life parameter of the ally characters at the end of the game. More specifically, the score is calculated as a value obtained by adding, to the above subtraction result, a bonus value to be given under a predetermined condition. The specific content of the bonus value is arbitrary. For example, the bonus value may be added when time the user has won the game, may be added according to that the user has used a predetermined placed character in the battle phase, or may be added according to that the user has defeated all the enemy characters. If a plurality of difficulty levels are set in the second game, the bonus value may be added according to the difficulty levels.

The score calculation method is arbitrary, and is not limited to the method based on the life parameters of the respective placed characters as in the present embodiment. For example, in another embodiment, the score may be calculated based on the win/loss result in the second game, may be calculated based on the number of the ally characters and the number of the enemy characters, which are placed at the end of the second game, or may be calculated based on a comparison between a total value of damages that the ally characters have caused to the enemy characters, and a total value of damages that the enemy characters have caused to the ally characters.

In the present embodiment, the information processing system calculates and displays a total of scores in the previous turns, in addition to calculating and displaying a score in the current turn. As a result, when the final turn of the second game ends, a total of scores in the respective turns is calculated as a score in the second game (referred to as "game score"). Although described in detail later, in the present embodiment, a cumulative score (i.e., a cumulative value of game scores in each second game) described later is calculated, and an in-game reward is given to the user based on the cumulative score.

As described above, in the present embodiment, the information processing system calculates a value of a user parameter associated with the user (i.e., a parameter used for giving an in-game reward to the user, specifically, a game score), based on a difference between a total value of the life parameters associated with the ally characters placed in the own army area, and a total value of the life parameters associated with the enemy characters placed in the enemy army area. Thus, a score, in which the content of the battle in the second game is reflected, is calculated, whereby a reward according to the content of the battle can be given to the user. For example, when the user has won by a huge gap, the user can earn more score than when the user has won in a close battle. As a result, the user can earn a better reward.

[2-2-5. Game in Second and Subsequent Turns]

In the second game, when the respective phases in the first turn have ended, a game in the second turn is started. In the second and subsequent turns, as in the first turn, the preparation phase, the battle phase, and the result display phase are executed in this order.

Figure 10:
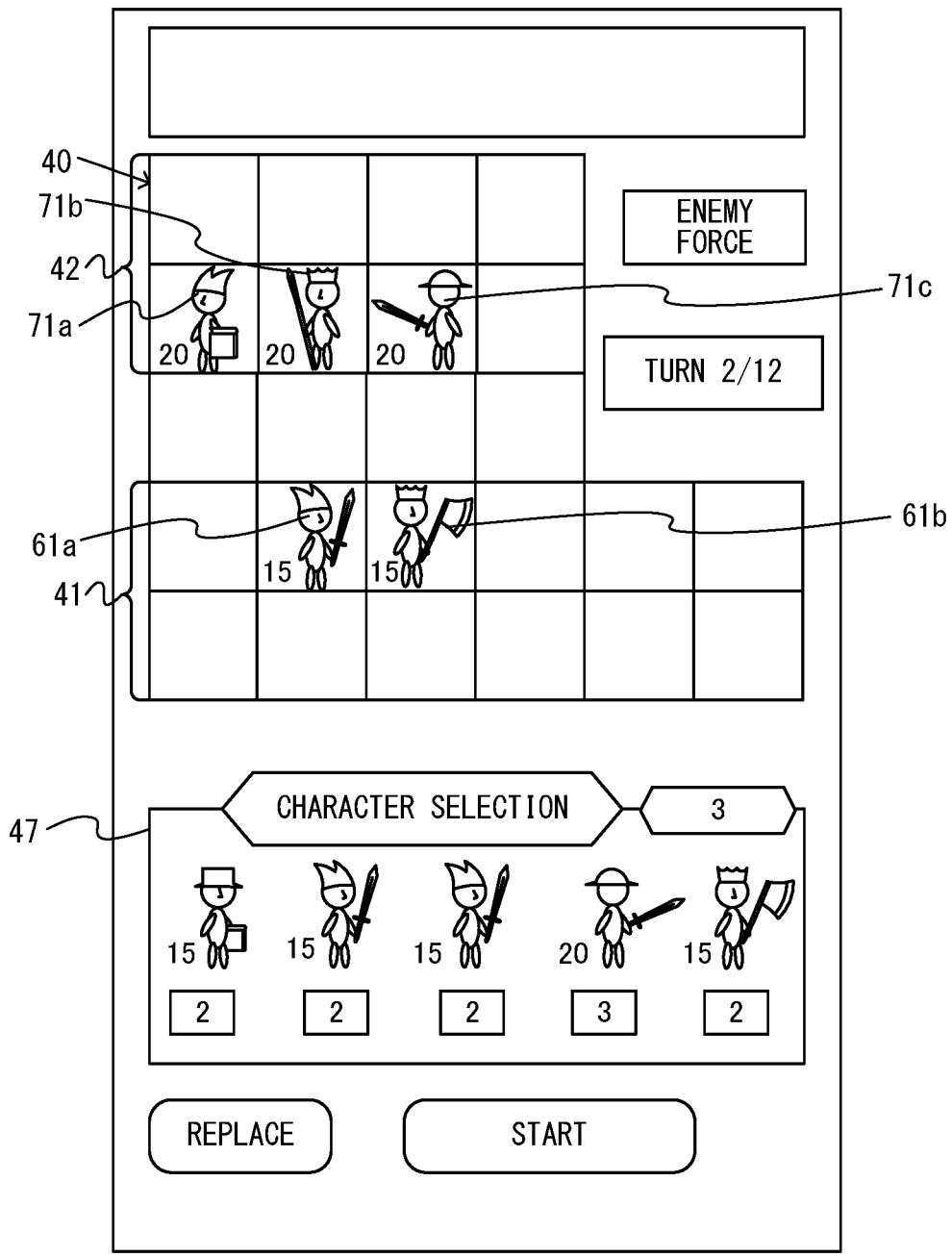
FIG. 10 shows an example of the preparation phase image in the second turn of the non-limiting second game.

FIG. 10 shows an example of a preparation phase image in the second turn of the second game. FIG. 10 shows an example of a preparation phase image that is displayed in the second turn after the state of the first turn shown in FIG. 7 to FIG. 9. As shown in FIG. 10, also in the second turn, as in the first turn, ally characters and enemy characters (in FIG. 10, ally characters 61a and 61b, and enemy characters 71a to 71c) are placed in the battle area 40, and candidate characters are placed in the candidate presentation area 47.

In the present embodiment, when a turn is started, the information processing system places ally characters, which were placed in the battle phase in the last turn, as they are. The ally characters placed at the start of the current turn are the same as the ally characters that were placed at the start of the battle phase in the last turn. That is, the information processing system starts a turn next to a certain turn while leaving the ally characters that were placed in the own army area at the start of the certain turn. Therefore, even an ally character, which was defeated by an enemy character (i.e., deleted from the battle area) in the battle phase in the certain turn, is again placed in the own army area in the next turn. The reason is as follows. That is, if an ally character that was defeated in the last turn is not placed in the battle area 40 in the current turn, there is a possibility that the difficulty of the game in the current turn may become excessively high when many ally characters were defeated in the last turn. Moreover, in the present embodiment, since strengthening (or growing) a use character is a fun factor of the second game, if a strengthened ally character cannot be placed again after defeated, the fun of strengthening the use character may be reduced.

In the present embodiment, when a turn is started, the information processing system sets the life parameter of each ally character placed in the own army area to an upper limit value (i.e., to the maximum physical strength). That is, even when the value of the life parameter of an ally character became smaller than the upper limit value due to an attack by an enemy character in the battle phase in a certain turn, the parameter of the ally character is restored to the upper limit value in the next turn. Thus, for example, a possibility that the difficulty of the game in the current turn becomes excessively high because of the life parameter of the ally character having been decreased in the last turn, can be reduced.

When a turn is started, the information processing system again selects candidate characters from among the use characters, and the terminal apparatus 2 newly places the selected candidate characters in the candidate presentation area 47 (see FIG. 10). Since selection of candidate characters is performed at random as described above, candidate characters different from those in the last turn can be selected.

In the present embodiment, the information processing system selects, as a candidate character, only a use character whose cost is small as far as the number of turns is small. For example, the information processing system causes a use character, whose cost is greater than a value obtained by adding 1 to the current number of turns, not to be selected or to be hardly selected as a candidate character (e.g., in the second turn, a use character whose cost is greater than 3 is not selected as a candidate character). Thus, while the number of turns is small from starting the second game, a strong use character (i.e., a use character whose cost is great) is placed in the own army area 41, thereby reducing the possibility that the difficulty of the second game becomes excessively low.

The information processing system may perform selection of candidate characters by a method in which selection probability of a use character whose cost is small is higher than that of a use character whose cost is great.

The method of selecting candidate characters from among the use characters is arbitrary. For example, in another embodiment, the information processing system may select candidate characters from among the use characters according to a predetermined rule (e.g., in the order of registration as use characters).

As described above, in the present embodiment, a possession cost is given to the user in each turn. The information processing system may give a small amount of possession cost while the number of turns is small, and may gradually increase the amount of possession cost as the number of turns increases. For example, the information processing system may increase the possession cost only by 2 in the first turn, and may increase the possession cost by 3 in the second turn. Thus, while the number of turns is small from starting the second game, a strong use character is placed in the own army area 41, thereby reducing the possibility that the difficulty of the second game becomes excessively low.

The information processing system sets, for each turn, enemy characters to be placed in the enemy army area 42. In the present embodiment, a set consisting of one or more enemy characters to be placed in the enemy army area 42 differs for each turn. The enemy character setting method will be described later.

[2-2-6. Strengthening Based on Update Condition]

In the present embodiment, an ally character can be strengthened (grown) under a predetermined condition during the second game. That is, the information processing system raises the level of an ally character when the ally character has satisfied an update condition. Hereinafter, a process of raising the level of an ally character will be described.

Figure 11:
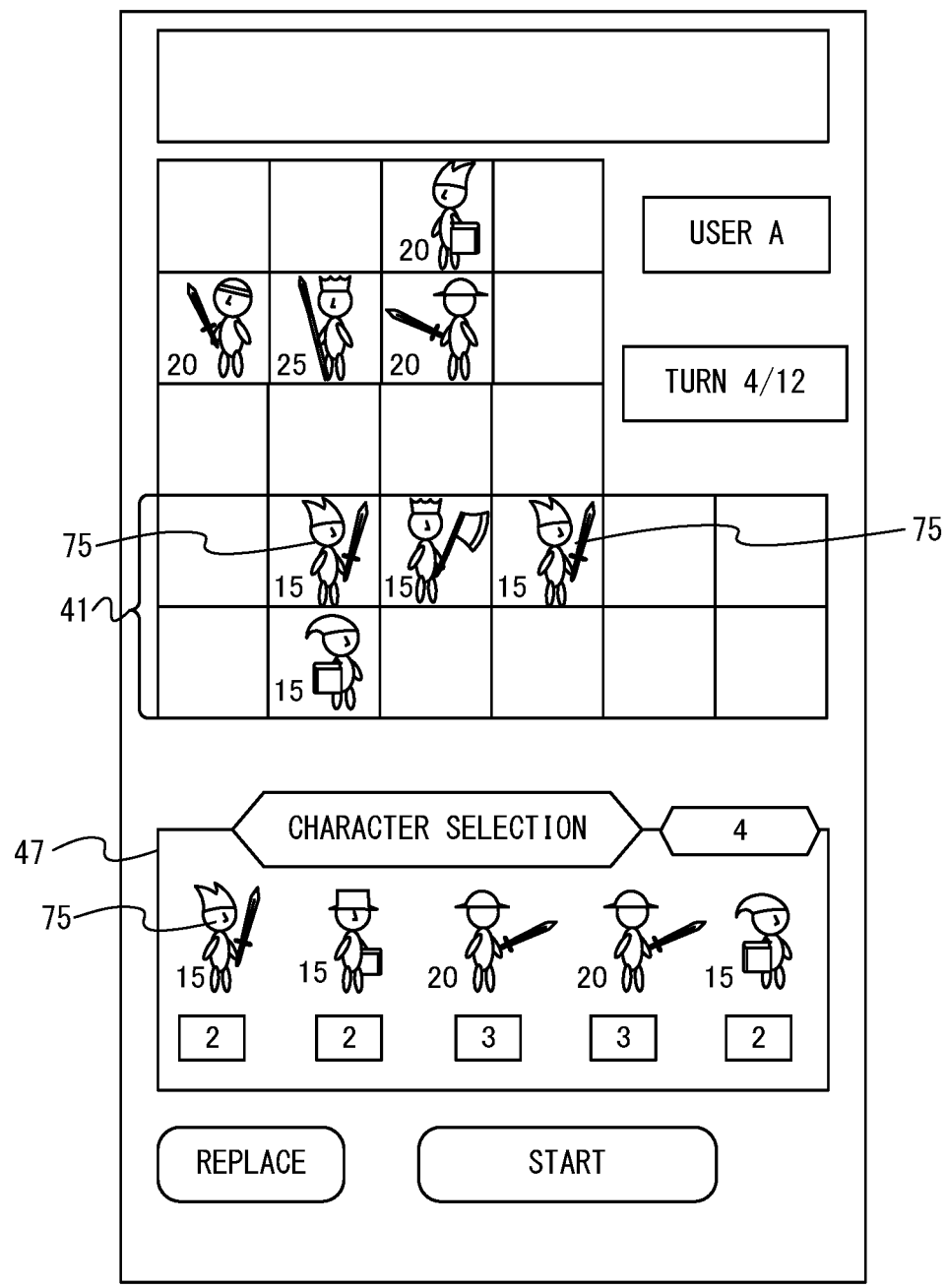
FIG. 11 shows an example of the preparation phase image during the non-limiting second game.

FIG. 11 shows an example of a preparation phase image during the second game. In the example shown in FIG. 11, two characters 75, which are identical characters, are placed in the own army area 41, and furthermore, an identical character 75 is placed as a candidate character in the candidate presentation area 47. Thus, in the present embodiment, a plurality of identical ally characters may be placed in the own army area 41, and a character identical to an ally character placed in the own army area 41 may be placed as a candidate character. Although not shown, a plurality of identical characters may be simultaneously presented as candidate characters (however, there is a predetermined limitation as described later).

In the present embodiment, the update condition for raising the level of an ally character is that three identical characters are simultaneously placed in the own army area 41. That is, according to that three identical ally characters are simultaneously placed in the own army area 41, the information processing system raises the level of the ally character. In the example shown in FIG. 11, according to that the user has made an instruction input to place the candidate character 75 in the candidate presentation area 47, in the own army area 41 as an ally character, the information processing system raises the level of the ally character.

Figure 12:
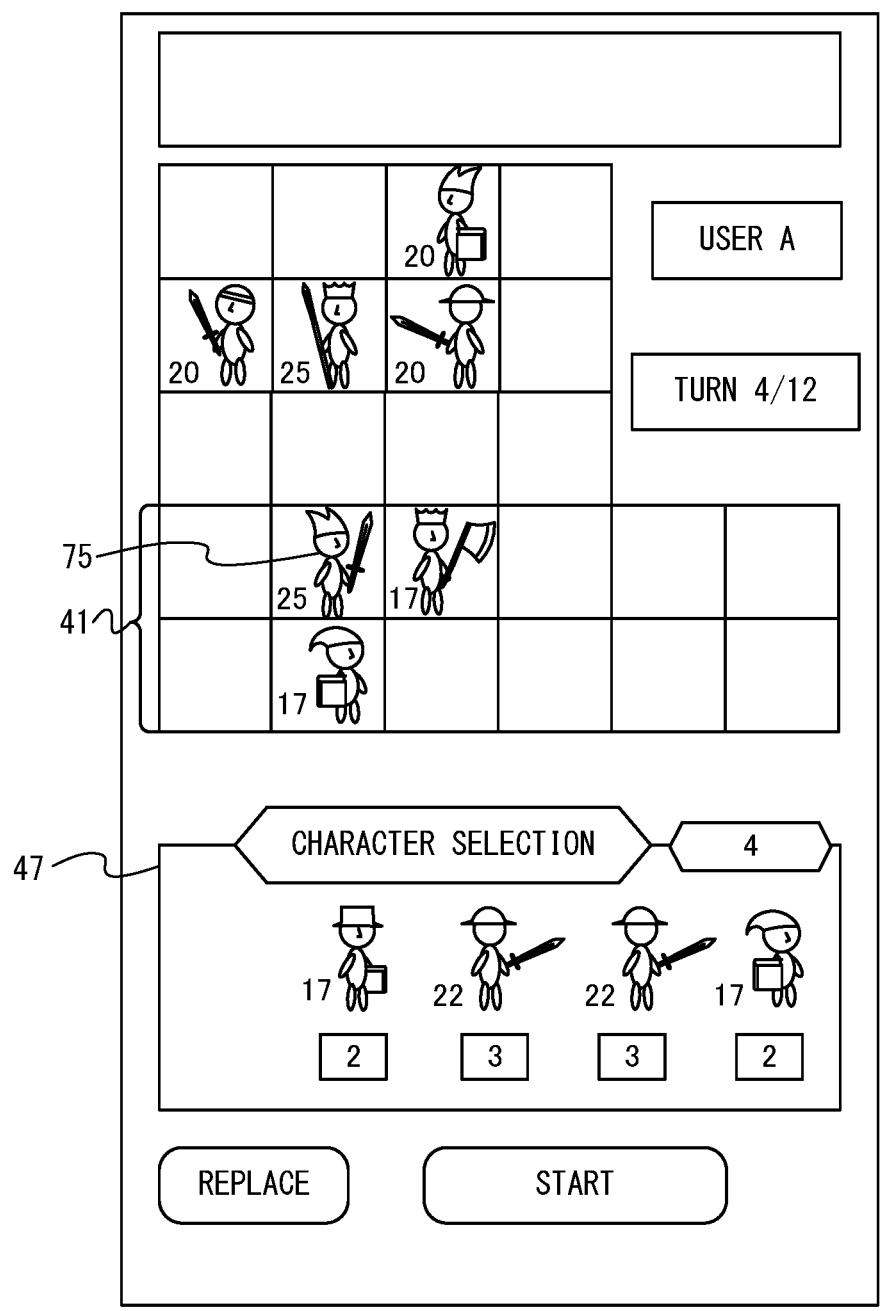
FIG. 12 shows an example of a state where the level of an ally character is raised from the state shown in FIG. 11.

FIG. 12 shows an example of a state where the level of the ally character is raised from the state shown in FIG. 11. In the example shown in FIG. 12, the level of the ally character 75 is raised by 10 and becomes 25. Thus, in the present embodiment, as for an ally character having satisfied the update condition, the level thereof is raised by 10. As described above, in the present embodiment, the various types of ability parameters (except for the level), the rarity, and the skill of each use character in the second game is set based on the level of the use character. Therefore, with the level of the ally character being raised, the abilities (i.e., the various types of ability parameters, the rarity, and the skill) of the ally character are strengthened.

As shown in FIG. 12, in the present embodiment, the ally characters 75 having satisfied the update condition become one character (in other words, the three identical characters are synthesized). The reason is as follows. If all the three ally characters having the raised levels are placed, the ally characters placed in the own army area 41 become excessively strong as a whole, which may result in excessive reduction in the difficulty of the game. Moreover, in the above case, strategic characteristics arise in selecting one of: placing only one ally character in exchange for raising the level; and placing two ally characters without raising the level, whereby the entertainment characteristics of the game can be improved.

As described above, in the present embodiment, the information processing system synthesizes a plurality of ally characters satisfying the condition among the ally characters placed in the own army area, into one ally character, and then sets the abilities associated with the synthesized ally character so as to be different in content from the abilities associated with the ally characters before the synthesis. This improves the strategic characteristics of the game.

The "synthesizing a plurality of ally characters" means not only synthesizing identical ally characters as in the present embodiment but also synthesizing a plurality of different ally characters. For example, in another embodiment, the information processing system may synthesize specific three types of ally characters into one ally character to raise the level of the ally character.

The "setting the abilities to be associated with the synthesized ally character to the contents different from the abilities associated with the ally character before the synthesis" is not limited to setting the respective abilities of the synthesized ally character to be higher than those of the ally character before the synthesis. For example, in another embodiment, the information processing system may set a part of the abilities of the synthesized ally character to be higher than that of the ally character before the synthesis while setting the other part of the abilities of the synthesized ally character to be lower than that of the ally character before the synthesis. In this case, the strategic characteristics of the game can be improved as in the present embodiment.

As described above, in the present embodiment, in the second game, the information processing system places an ally character (or a use character), whose ability is set to be lower than the ability of the corresponding possessed character in the first game, in the virtual space (specifically, the battle area) of the second game (see FIG. 5). Then, when the update condition regarding the ally character placed in the virtual space has been satisfied during the second game, the information processing system changes the ally character having satisfied the update condition so as to have an updated (i.e., strengthened) ability. That is, in the present embodiment, although the use character is set to be weaker than the possessed character at start of the second game, the use character can be strengthened during the second game, and in some cases, can be strengthened to be stronger than the possessed character (see FIG. 5). Thus, in the present embodiment, the user can enjoy strengthening a possessed character, which has already been strengthened in the first game, again also in the second game. Thus, in the present embodiment, the information processing system can provide a new game including growing elements, as the second game using the possessed character in the first game.

In the present embodiment, each time the second game is newly started, the information processing system sets second ability data indicating the abilities of the use characters in the second game. That is, since the abilities of the use characters are reset each time the second game is started, the user can repeatedly enjoy the second game including the growing elements.

In the present embodiment, the update condition regarding a possessed character (i.e., the update condition in the first game) is different from the update condition regarding an ally character (i.e., the update condition in the second game). In this case, since the condition for strengthening a character (e.g., raising the level of the character) differs between the first game and the second game, the fun factors of the first game and the second game can be made different from each other. Thus, motivation to play both the first game and the second game can be given to the user.

As described above, in the present embodiment, according to that the level of an ally character is raised in the second game, the ability of this ally character is strengthened. Here, regarding at least a part of the ability (e.g., skill and additional strengthening) of the ally character, the information processing system sets an upper limit of the ability of the ally character to be the same as the ability of the possessed character. Specifically, an upper limit of the skill (i.e., the final stage of the skill) of the ally character is set to be the same as the skill of the possessed character. In addition, an upper limit of the strengthening stage of the additional strengthening of the ally character is set to be the same as the additional strengthening of the possessed character. In this case, the upper limit of the ability of the use character is raised by strengthening the ability of the possessed character, motivation to play the first game can be given to the user who plays the second game.

In the present embodiment, regarding at least a part (e.g., rarity) of the ability of an ally character, the information processing system sets an upper limit of the ability of the ally character to be the same as an upper limit of the ability of the possessed character. Specifically, the upper limit of the rarity of the ally character is set to "5" that is the upper limit of the rarity of the possessed character. In this case, when the level of the ally character is raised and thereby the ally character is strengthened, the user can easily know that the rarity and the skill have reached the upper limits.

In the present embodiment, regarding at least a part of the ability of the ally character, the information processing system updates the ability of the ally character, with an upper limit being independent from the upper limit of the ability of the possessed character. Specifically, the upper limit of the level of the ally character is set to "99" which is different from the upper limit (i.e., "40") of the level of the possessed character. Also, regarding the ability parameters other than the level, the upper limit of each ability parameter of the ally character is set to a value (specifically, a larger value) different from the upper limit of the ability parameter of the possessed character. Thus, since the character can be further strengthened in the second game than in the first game, motivation to play the second game can be given to the user who desires to further strengthen the character.

in the present embodiment, when a certain ally character has satisfied the update condition, not only the level of this ally character but also the levels of other use characters (including a character already placed in the battle area as an ally character, and a use character not placed in the battle area) are raised. In the example shown in FIG. 12, the level of the ally character 75 having satisfied the update condition is raised by 10, and the levels of the other ally characters are each raised by 2.

As described above, in the present embodiment, when the update condition regarding an ally character has been satisfied during execution of the second game, the information processing system updates the ability of the ally character having satisfied the update condition and the ability of another ally character different from the ally character so as to strengthen the abilities of these ally characters. Here, if there is a large difference in ability between ally characters, it is difficult to cause an ally character having a lower ability to be active in the game, which may reduce the entertainment characteristics of the game. Meanwhile, in the present embodiment, it is possible to reduce the difference in ability between the ally character having satisfied the update condition and the other ally character.

In the second game of the present embodiment, since the level of the ally character having satisfied the update condition is raised by 10 at one time, the amount of strengthening when the update condition has been satisfied (i.e., the amount of raise in the level) is greater than in the case where the possessed character has satisfied the update condition in the first game. Therefore, if only the level of the ally character having satisfied the update condition is raised, a large difference in level is likely to be caused between the ally character having satisfied the update condition and the other use characters. In this regard, in the present embodiment, since the levels of the ally characters that do not satisfy the update condition are also raised, the possibility of such a large difference in level between the use characters is reduced.

In the present embodiment, the amount of raise in the level (i.e., 10) regarding the ally character having satisfied the update condition is set to be larger than the amount of raise in the level (i.e., 2) regarding the other use characters that do not satisfy the update condition. That is, when the update condition for a use character has been satisfied during the second game, the information processing system updates the abilities of the use characters such that the ability of the use character having satisfied the update condition is more strengthened than the abilities of the other use characters. If the amount of raise in the level is the same between the ally character having satisfied the update condition and the other use characters, the same result is achieved regardless of which character has satisfied the update condition, which may lack the strategic characteristics. Meanwhile, in the present embodiment, since the amount of strengthening differs between the ally character having satisfied the update condition and the other use characters, the user progresses the second game while considering which ally character should satisfy the update condition, thereby improving the strategic characteristics of the second game.

In the present embodiment, in a case where, after the level of a certain ally character has been raised, a character identical to the ally character is newly selected as a candidate character, the level of the candidate character is set to the same level as the ally character. For example, after the state shown in FIG. 12, if a character identical to the ally character 75 is newly selected as a candidate character, the level of the candidate character becomes "25" which is the same as the level of the ally character 75. That is, a plurality of identical use characters may appear in the second game, and all the use characters are set to the same level. This allows the user to easily grasp the current levels of the respective use characters.

As described above, in the present embodiment, a plurality of identical characters may be simultaneously presented as candidate characters. However, if three identical characters are simultaneously selected as candidate characters, the level of this character can be easily raised. Therefore, in the present embodiment, the information processing system selects candidate characters such that the update condition is not satisfied only by the candidate characters simultaneously selected (i.e., such that three identical characters are not simultaneously selected). Thus, the possibility that the update condition is easily satisfied can be reduced.

[2-2-7. Strengthening Based on Arrangement of Placed Characters]

In the second game of the present embodiment, the abilities of ally characters are strengthened according to a combination of ally characters to be placed in the battle area. Hereinafter, strengthening based on a combination of ally characters is referred to as "combination strengthening". Hereinafter, the combination strengthening will be described.

In the present embodiment, if ally characters placed in the own army area 41 include a predetermined combination of ally characters, the information processing system strengthens the abilities of the ally characters. The predetermined combination of ally characters is determined in advance in the game application. In the present embodiment, the combination to be subjected to combination strengthening is a combination of characters equipped with specific three types of weapons (e.g., a sword, a spear, and an axe), or a combination of three types of characters having a specific one type of attribute (e.g., red attribute). The content of the combination to be subjected to combination strengthening is arbitrary, and is not limited to the above content. Moreover, as described above, there may be a plurality of types of combinations to be subjected to combination strengthening.

Figure 13:
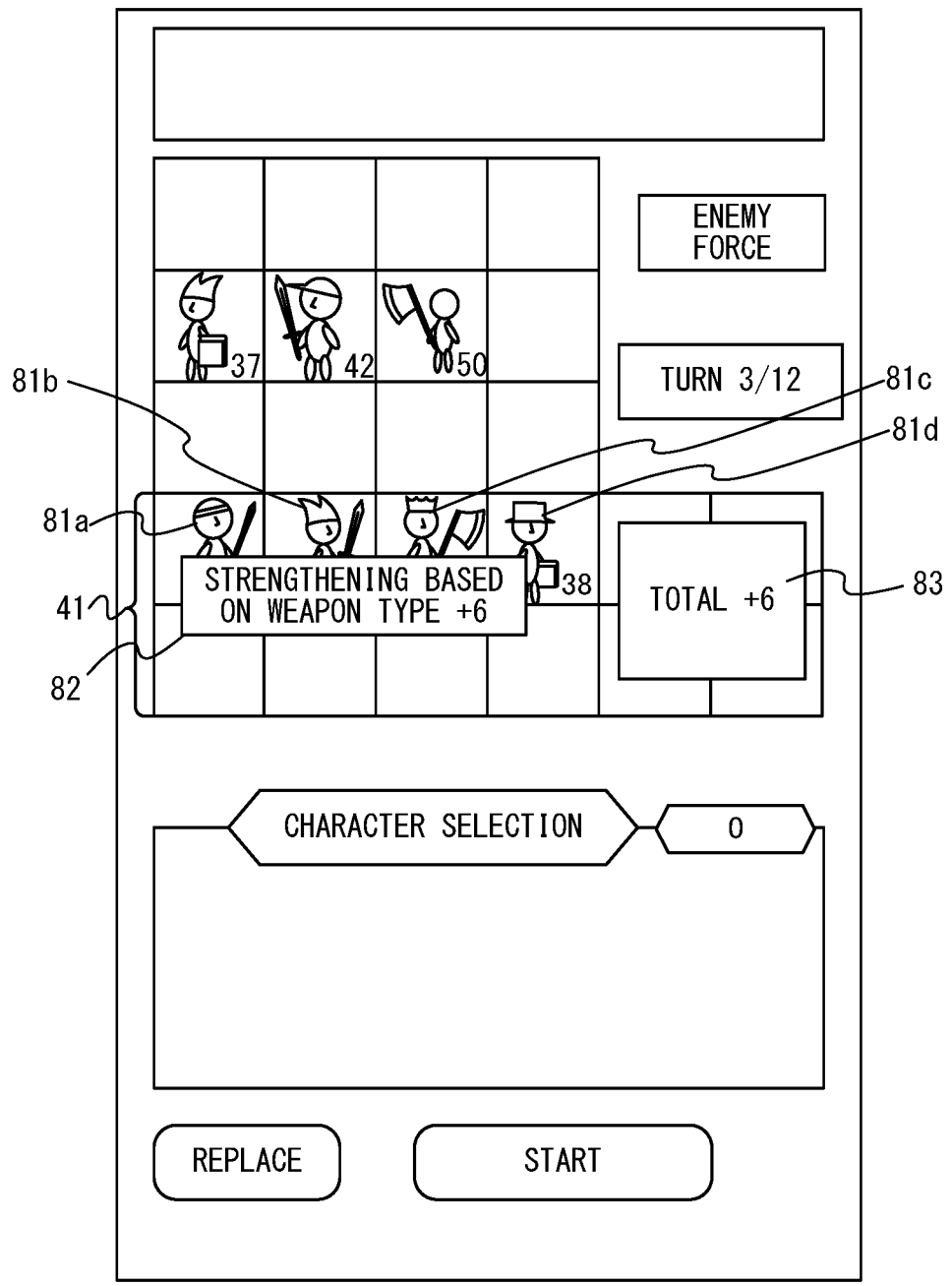
FIG. 13 shows an example of the battle phase image when combination strengthening is performed.

FIG. 13 shows an example of the battle phase image when combination strengthening is performed. In the example shown in FIG. 13, a combination of three types of characters (ally characters 81a to 81c shown in FIG. 13) equipped with weapons of a sword, a spear, and an axe, respectively, is placed in the own army area 41. Therefore, the information processing system performs combination strengthening on the ally characters.

In the present embodiment, when the above combination is placed in the own army area 41, the information processing system raises the ability parameters (except for the level) of each of the ally characters placed in the own army area 41 by a predetermined amount (e.g., 6). The ability of the ally character to be strengthened by the combination strengthening is arbitrary. For example, in another embodiment, the level of the ally character may be raised by the combination strengthening, or the rarity and/or the skill may be strengthened. In the present embodiment, the abilities of all the ally characters (in FIG. 13, the ally characters 81a to 81d) placed in the own army area 41 are strengthened by the combination strengthening. However, in another embodiment, the abilities of only the ally characters (in FIG. 13, the ally characters 81a to 81c) included in the combination that satisfies the condition for combination strengthening, among the ally characters placed in the own army area 41, may be strengthened by the combination strengthening.

In the present embodiment, when combination strengthening is performed, the terminal apparatus 2 displays, on the display section 24, the battle phase image including a strengthening notification image 82 (see FIG. 13). The strengthening notification image 82 indicates the type of the combination having satisfied the condition for combination strengthening (in FIG. 13, a message "strengthening based on weapon type"), and the content of strengthening by the combination strengthening (in FIG. 13, a message "+6"). With the strengthening notification image 82, the information processing system can notify the user of: the combination strengthening having been performed; the type of the combination having satisfied the condition for combination strengthening; and the effect of the combination strengthening.

In the present embodiment, when combination strengthening is performed, the terminal apparatus 2 displays, on the display section 24, the battle phase image including a strengthening total image 83 (see FIG. 13). The strengthening total image 83 indicates a total value of strengthening performed by one or more types of combination strengthening. In the example shown in FIG. 13, since only one type of combination strengthening, i.e., "strengthening based on weapon type", has been performed, the strengthening total image 83 indicates "+6" caused by the combination strengthening that is "strengthening based on weapon type". For example, if the ability parameters (except for the level) of the ally character are raised by 4 through another combination strengthening in addition to the above "strengthening based on weapon type", the strengthening total image 83 indicates "+10". Thus, when a plurality of types of combination strengthening are performed, the information processing system may simultaneously perform the respective types of combination strengthening on the ally character.

In the present embodiment, the information processing system determines whether or not to perform the above combination strengthening, when the battle phase is started (specifically, before a placed character performs an attack). In addition, in the present embodiment, the effect of the combination strengthening is available only in the current turn. That is, the combination strengthening is performed only during the current turn. In the next turn, the information processing system restores the ability of the ally character strengthened through the combination strengthening. In the next turn, whether or not to perform combination strengthening is determined based on ally characters to be placed in the own army area 41 in the next turn.

As described above, in the present embodiment, the information processing system, according to a combination of a plurality of ally characters placed in the own army area, changes the ability parameters associated with at least the ally characters, during the current turn. Thus, the combination of ally characters placed in the own army area also has an influence on the game progress and result of the second game, whereby the strategic characteristics of the second game can be improved.

In the present embodiment, combination strengthening is also performed on enemy characters, based on a combination of enemy characters placed in the enemy army area 42, in a similar manner to that for the ally characters. When combination strengthening is performed on enemy characters, as in the case of the combination strengthening on the ally characters, the terminal apparatus 2 displays, on the display section 24, a battle phase image including a strengthening notification image and a strengthening total image regarding the combination strengthening on the enemy characters.

[2-2-8. Setting of Enemy Character]

Next, a method of setting enemy characters that appear in each turn of the second game will be described. In the present embodiment, the contents (specifically, the type, placement, and ability) of each enemy character to be placed in the enemy army area in each turn are set by the information processing system.

Figure 14:
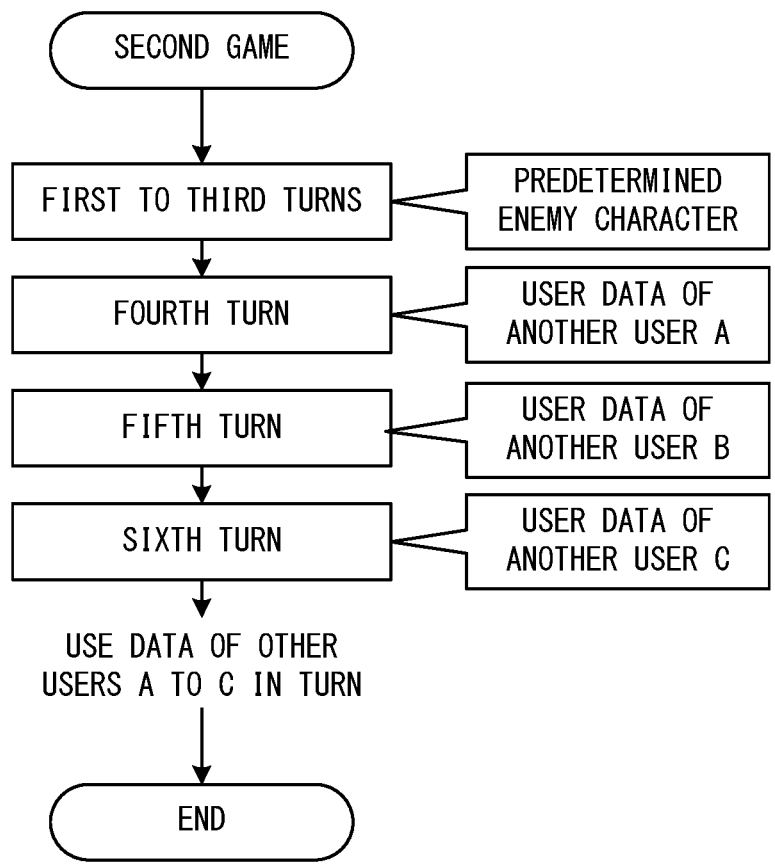
FIG. 14 shows an example of an enemy character setting method in each turn of the non-limiting second game.

FIG. 14 shows an example of an enemy character setting method in each turn of the second game. As shown in FIG. 14, in the present embodiment, in the first to third turns of the second game, predetermined enemy characters are placed with the contents determined in the game application. In the fourth and subsequent turns, the contents of enemy characters are determined based on the contents of ally characters that are used in the second game by another user. That is, in the second game of the present embodiment, the other user can be regarded as an opponent user for the user of the terminal apparatus 2.

In a case where an enemy character is set based on the content of an ally character of the other user, the enemy character may be strong or weak, that is, the strength of the enemy character varies. Therefore, in the initial turns (specifically, the first to third turns) of the second game, enemy characters are placed with the contents determined in the game application so as to make the strengths of the enemy characters uniform. In another embodiment, enemy characters based on the contents of ally characters of the opponent user may be set from the first turn.

In the present embodiment, when the user of the game application has performed the second game, the information processing system stores therein, for each turn, play data indicating the type, placement, and strength of an ally character in each turn of the second game. For example, the play data is stored in the server 1 in association of the user corresponding to the play data. Then, in each of the fourth and subsequent turns of the second game performed by the user of the terminal apparatus 2, the information processing system sets an enemy character based on play data of another user (i.e., an opponent user) regarding the same turn as the above turn. For example, in the fourth turn of the second game, the content of the enemy character is set based on the content of the ally character that was placed in the fourth turn of the second game performed by the other user.

In more detail, in the present embodiment, in each of the fourth and subsequent turns of the second game, the information processing system sets, as the content of the enemy character, the content of the ally character as it is which was placed in the corresponding turn when the opponent user performed the second game. That is, the type, placement, and ability of the ally character of the opponent user becomes the type, placement, and ability of the enemy character. This allows the user to battle with the opponent (i.e., the enemy character) in which the content of play that the other user actually performed is reflected. In addition, the user can battle with enemy characters in which the features of other users are reflected, so that the user can enjoy the best part of the competitive game, that is, battling with various types of opponents.

In another embodiment, as for the content of the enemy character in the fourth and subsequent turns of the second game, the information processing system may use the content of the ally character, which was placed in the corresponding turn when the opponent user performed the second game, to which a certain change has been added. For example, if a plurality of stages of difficulties are set in the second game, the ability of the ally character of the opponent user may be changed (i.e., strengthened or weakened) according to the difficulty.

As described above, in the present embodiment, the information processing system stores therein play data indicating: an ally character (e.g., the type and ability of the ally character) in the own army area in at least one turn in the second game performed by another user different from the user; and placement of this ally character. The information processing system determines, in at least one of a plurality of turns, an enemy character in the enemy army area and placement of the enemy character, based on the play data. Thus, the second game in which the user battles with the other user can be presented to the user. Moreover, in the present embodiment, since the play data is used, the information processing system need not select an opponent user from among other users performing the game at the start of the second game, thereby facilitating selection of an opponent user. Moreover, when the number of turns in the play data is matched to the number of turns in which the play data is used, the strength of the enemy character can be made substantially equal to the strength of the ally character.

As shown in FIG. 14, in the present embodiment, enemy characters are set such that the play data of the same user is not used for consecutive two turns. Specifically, in the present embodiment, in one second game, three pieces of play data respectively related to three other users are used for setting of enemy characters, and the three pieces of play data are used in turn. That is, play data of a user A is used for the fourth turn, play data of a user B is used for the fifth turn, and play data of a user C is used for the sixth turn. As for the seventh and subsequent turns, the pieces of play data of the users A to C are repeatedly used in turn.

As described above, in the present embodiment, the information processing system stores therein pieces of play data related to a plurality of other users different from the user, in association with the other users. The information processing system determines an enemy character and placement of the enemy character in the current turn, based on the play data of a user who is different from a user associated with the play data that was used for determination of an enemy character and placement of the enemy character in the last turn.

In the present embodiment, since an ally character that was defeated in the last turn is also placed in the own army area in the current turn, it is considered that the same ally character tends to be placed in a certain turn and the next turn. Therefore, it is considered that play data tends to indicate the content in which the same character is placed in a certain turn and the next turn. Therefore, if setting of enemy characters is performed by using such play data for the consecutive two turns, the possibility of appearance of the same enemy character in the two turns becomes high. In this case, even if an enemy character was defeated in the last turn, this enemy character is again placed in the next turn, which may make the user feel discomfort. In addition, it is also considered that placement of enemy characters does not differ much between the last turn and the current turn, which may reduce the entertainment characteristics of the game.

Therefore, in the present embodiment, play data to be used is made different between a certain turn and the next turn. This prevents the user from feeling discomfort, and prevents the entertainment characteristics of the game from being reduced due to similar placement of enemy characters between the last turn and the current turn.

Although described in detail later, in the present embodiment, a class is set on each user performing the second game. In the present embodiment, as for the play data used for setting of enemy characters, pieces of play data respectively related to three other users selected from among users of the same class as the user of the terminal apparatus 2. That is, the information processing system selects three users from among the users of the same class as the user of the terminal apparatus 2, and performs setting of enemy characters based on the play data related to the selected users. In this case, the user can battle with the other users of the same level as his/her level, and can have the fun of raising the class. The method of selecting other users is arbitrary. In another embodiment, not only other users of the same class as the user but also other users of classes close to the class of the user may be selected. Alternatively, other users may be selected at random regardless of the classes.

In the present embodiment, the number of turns in one second game is set according to the class of the user. For example, the number of turns in one second game ranges from 9 to 12, and the higher the class of the user is, the more the number of turns increases. In another embodiment, the number of turns in one second game is arbitrary, and may be fixed regardless of the user or may be set at random.

[2-2-9. Reward]

In the present embodiment, a reward is given to the user according to the result of the second game. The content of the reward is arbitrary. In the present embodiment, as an in-game reward, an item that can be used in the game is given to the user.

In the present embodiment, the user can play the second game within a predetermined play-allowed period. That is, the information processing system executes the second game only in the play-allowed period. Specifically, the play-allowed period may be any period. For example, one play-allowed period is set to 6 days. In the present embodiment, no play-allowed period is set for the aforementioned first game, that is, the first game is always playable.

In the present embodiment, the information processing system calculates a cumulative total of game score (referred to as "cumulative score") that the user have earned in the second game within one play-allowed period. In the present embodiment, it is assumed that no limitation is imposed on the number of times that the user can play the second game within the play-allowed period. Each time the user plays the second game in the play-allowed period, a game score is calculated. The information processing system calculates a cumulative score by accumulating the game score for each second game. When the play-allowed period has expired, the information processing system determines a reward to be given to the user, based on the cumulative score in the play-allowed period. Giving a reward as described above motivates the user to play the second game.

The method of determining a reward to be given to the user according to the result of the second game is arbitrary. For example, in another embodiment, each time a second game is performed, a reward may be determined based on a score in the second game. In still another embodiment, a reward may be determined based on a high score described below.

In another embodiment, the information processing system may impose a limitation on the number of times the user can play the second game within the play-allowed period. For example, the information processing system may give points to the user when the play-allowed period is started, and may allow the user to play one second game in exchange for consumption of a predetermined number of points by the user.

The aforementioned class set on each user is determined based on a high score in the second game within the play-allowed period. Specifically, in the present embodiment, the play-allowed period is divided into a plurality of sub periods, and the information processing system calculates, for each user, a high score in the second game within each sub period. Each time a sub period has ended, the information processing system determines, based on the high score of each user in the sub period, a class of each user in the next sub period. For example, for each of the users included in the same class, the information processing system may give a rank based on the high score of the user, and may raise, by 1, the classes of a predetermined number of users whose ranks are high and may lower, by 1, the classes of a predetermined number of users whose ranks are low. The class determination method is arbitrary, and is not limited to the above method. For example, in another embodiment, the class of each user may be set based on the cumulative score of the user.

Figure 15:
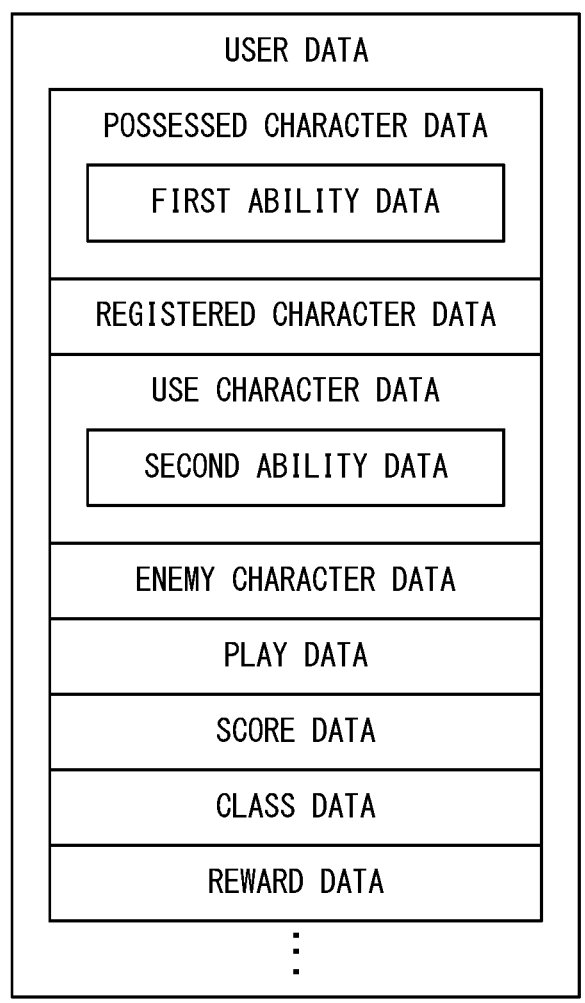
FIG. 15 shows an example of various types of data used for information processing in the non-limiting information processing system.

3. Specific Example of Processing Performed in Information Processing System With reference to FIG. 15 to FIG. 22, a specific example of information processing in the information processing system will be described.
[3-1. Date Used for Information Processing]
FIG. 15 shows an example of various types of data used for the information processing in the information processing system. The data shown in FIG. 15 are stored in the storage section 12 of the server 1 (or the memory in the processing section 11), for example.

As shown in FIG. 15, the server 1 stores therein user data related to a user of the game application. In the present embodiment, the user data includes possessed character data, registered character data, use character data, enemy character data, play data, score data, class data, and reward data. The server 1 stores the user data for each user of the game application. The user data may include data indicating items that the user can use in the game application, in addition to the data shown in FIG. 15.

The possessed character data is data related to one or more characters possessed by the user. Specifically, the possessed character data includes, for each possessed character, first ability data indicating the ability of the possessed character. In the possessed character data, the possessed character is associated with the first ability data of the possessed character.

The registered character data indicates one or more characters that are used as use characters in the second game, among the possessed characters. As described above, the possessed characters indicated by the registered character data may include possessed characters of other users in addition to the possessed characters of the user of the terminal apparatus 2.

The use character data is data related to the one or more use characters to be used in the second game. Specifically, the use character data includes, for each use character, second ability data indicating the ability of the use character. In the use character data, the use character is associated with the second ability data of the use character. In addition, the use character data includes, for each use character, data indicating the cost of the use character.

The play data indicates the type, placement, and strength of an ally character in each turn of the second game, as described above. The server 1 may not necessarily store therein play data regarding all the second games that the user has played. For example, in the present embodiment, the server 1 stores therein, for one user, play data regarding a second game in which a high score is recorded in the current sub period, and play data regarding a second game in which a high score was recorded in a sub period just previous to the current sub period.

The score data is data indicating a score set on the user. In the present embodiment, the score data includes: data indicating a cumulative score through one or more second games that the user has played in the current play-allowed period; and data indicating a high score in each of the sub periods included in the play-allowed period.

The class data is data indicating a class set on the user.
The reward data is data indicating a reward given to the user.
In addition to the data shown in FIG. 15, the server 1 stores therein a server-side game program. The server-side game program is a program for executing game processing (server processing shown in FIG. 22) to be executed in the server 1. That is, when the processing section 11 of the server 1 executes the server-side game program, server processing (see FIG. 22) described later is executed in the server 1.

The terminal apparatus 2 stores therein a terminal-side game program. The terminal-side game program is a program for executing game processing (terminal processing shown in FIG. 16) to be executed in the terminal apparatus 2. That is, when the processing section 21 of the terminal apparatus 2 executes the terminal-side game program, terminal processing (see FIG. 16) described later is executed in the terminal apparatus 2.

The terminal apparatus 2 may store therein a part or the entirety of the various types of data (see FIG. 15) stored in the server 1, for use in executing the terminal processing. The various types of data to be used in the information processing system may be stored in either the server 1 or the terminal apparatus 2. When the same data is stored in the server 1 and the terminal apparatus 2, synchronization between the data stored in the server 1 and the data stored in the terminal apparatus 2 is made at an appropriate timing.
[3-2. Processing in Terminal Apparatus]
FIG. 16 to FIG. 21 are flowcharts showing an example of a flow of terminal processing executed by the terminal apparatus. The terminal processing shown in FIG. 16 to FIG. 21 is started when execution of the terminal-side game program stored in the storage section 22 is started.

In the present embodiment, it is assumed that the CPU (in other words, the processor) of the processing section 11 of the server 1 or the processing section 21 of the terminal apparatus 2 executes processes in steps shown in FIG. 16 to FIG. 22 by executing the game program stored in the storage section 12 or 22. However, in another embodiment, a part of the processes in the steps may be executed by a processor (e.g., a dedicated circuit or the like) different from the CPU. When the terminal apparatus 2 is capable of communicating with the server 1, a part of the processes in the steps shown in FIG. 16 to FIG. 21 may be executed in the server 1. In addition, a part of the processes in the steps shown in FIG. 22 may be executed in the terminal apparatus 2. The processes in the steps shown in FIG. 16 to FIG. 22 are merely examples, and the processing order of the steps may be changed or another process may be executed in addition to (or instead of) the processes in the steps as long as similar results can be obtained.

The processing section 21 of the terminal apparatus 2 executes the processes in the steps shown in FIG. 16 to FIG. 21, by using the memory (or the storage section 22). That is, the CPU of the processing section 21 stores data obtained by each process step, in the memory, and reads out the data from the memory when using the data for the subsequent process steps. Likewise, the processing section 11 of the server 1 executes the processes in the steps shown in FIG. 22 by using the memory (or the storage section 12). That is, the CPU of the processing section 11 stores data obtained by each process step, in the memory, and reads out the data from the memory when using the data for the subsequent process steps.

Figure 16:
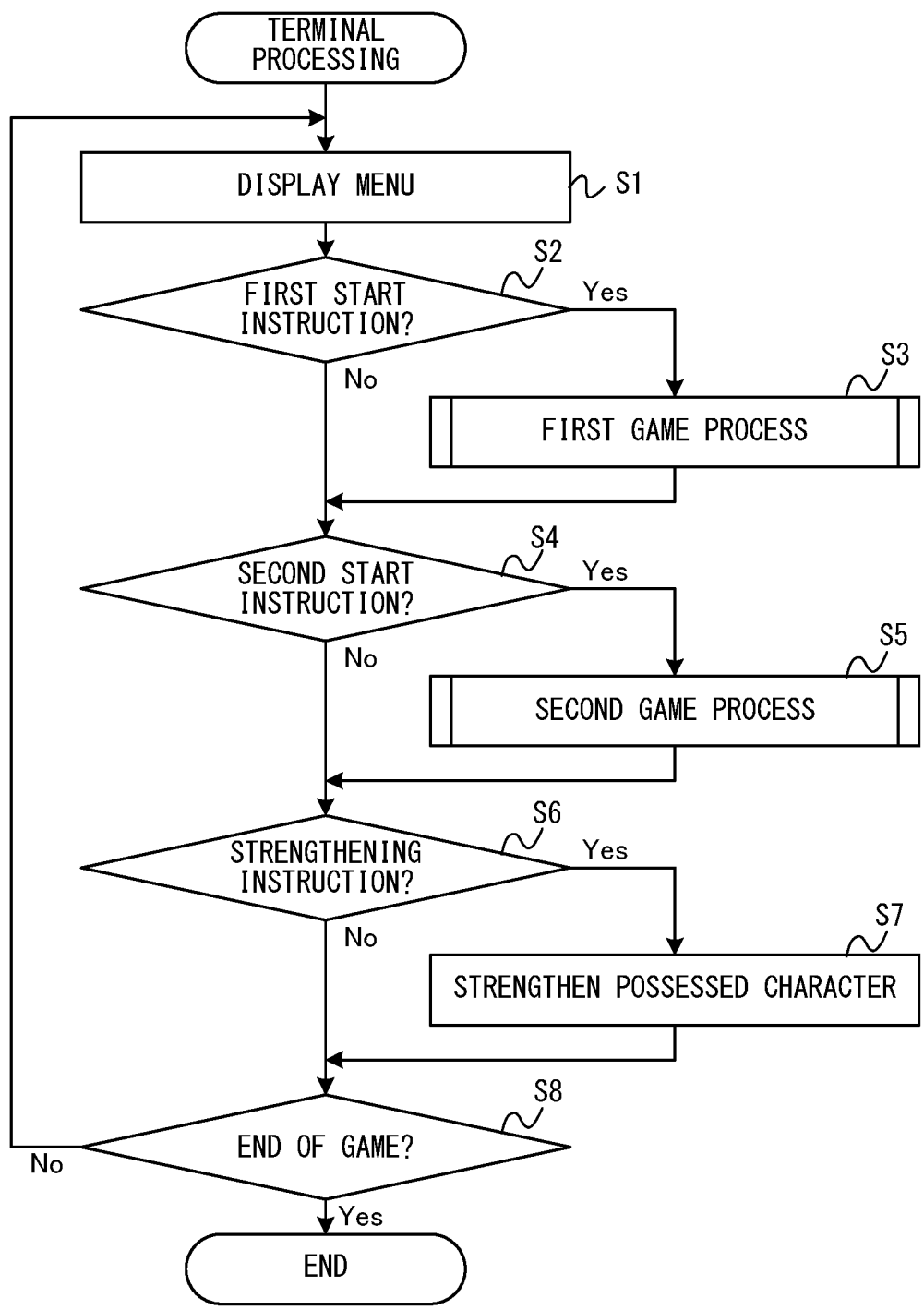
FIG. 16 is a flowchart showing an example of a flow of terminal processing executed by the non-limiting terminal apparatus.

In the terminal processing shown in FIG. 16, firstly, in step S1, the processing section 21 causes the display section 24 to display a menu image. Although not shown in FIG. 16, in the present embodiment, the menu image includes: a first start instruction button image with which the user performs a first start instruction to start the first game; a second start instruction button image with which the user performs a second start instruction to start the second game; and a strengthening instruction button image with which the user performs a strengthening instruction to strengthen the ability of a possessed character. Next to step S1, the process in step S2 is executed.

In step S2, the processing section 21 determines whether or not the first start instruction has been made by the user. Specifically, the processing section 21 determines, based on data from the input section 23, whether or not an input to the first start instruction button (e.g., an input of touching the first start instruction button) has been performed. When the determination result in step S2 is positive, the process in step S3 is executed. When the determination result in step S2 is negative, the process in step S4 described later is executed.

In step S3, the processing section 21 executes a first game process for executing the first game. The first game process will be described in detail later (see FIG. 17). When the first game process in step S3 has ended, the process in step S4 is executed.

In step S4, the processing section 21 determines whether or not the second start instruction has been made by the user. Specifically, the processing section 21 determines, based on data from the input section 23, whether or not an input to the second start instruction button (e.g., an input of touching the second start instruction button) has been performed. When the determination result in step S4 is positive, the process in step S5 is executed. When the determination result in step S4 is negative, the process in step S6 described later is executed.

In step S5, the processing section 21 executes a second game process for executing the second game. The second game process will be described in detail later (see FIG. 18 to FIG. 21). When the second game process in step S5 has ended, the process in step S6 is executed.

In step S6, the processing section 21 determines whether or not the strengthening instruction has been made by the user. Specifically, the processing section 21 determines, based on data from the input section 23, whether or not an input to the strengthening instruction button (e.g., an input of touching the strengthening instruction button) has been performed. When the determination result in step S6 is positive, the process in step S7 is executed. When the determination result in step S6 is negative, the process in step S8 described later is executed.

In step S7, the processing section 21 strengthens the rarity or the skill among the abilities of a possessed character, according to the user instruction. For example, the processing section 21 receives, from the user, an instruction that designates a possessed character to be strengthened among the possessed characters, and the content of strengthening (e.g., raising the rarity, acquiring the skill, or the like). Then, the processing section 21 strengthens the rarity or the skill of the possessed character, according to the instruction. At this time, the processing section 21 updates the possessed character data stored in the terminal apparatus 2 such that the raised ability parameter is indicated. Next to step S7, the process in step S8 is executed.

In step S8, the processing section 21 determines whether or not to end the game application. For example, the processing section 21 determines whether or not an instruction to end the game application has been made by the user. When the determination result in step S8 is negative, the process in step S1 is again executed. Thereafter, a series of processes in steps S1 to S8 is repeatedly executed until it is determined in step S8 to end the game application. When the determination result in step S8 is positive, the processing section 21 ends the terminal processing shown in FIG. 16.

Figure 17:
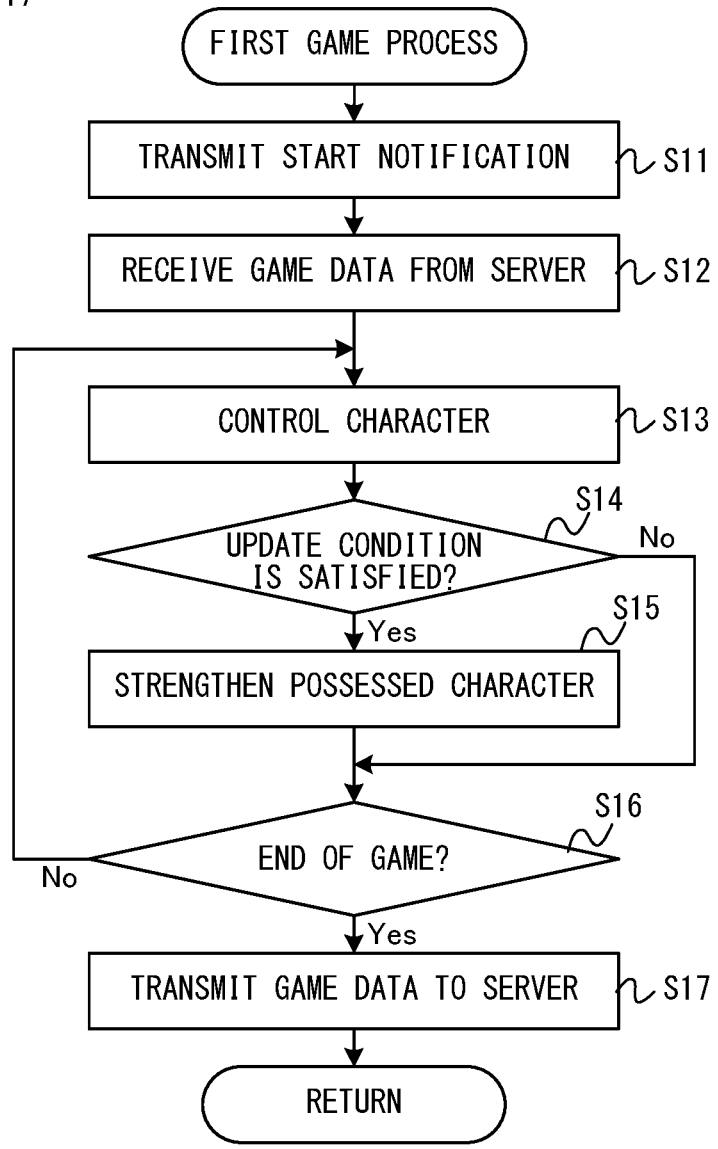
FIG. 17 is a sub flowchart showing an example of a specific flow of a first game process in step S3 shown in FIG. 16.

FIG. 17 is a sub flowchart showing an example of a specific flow of the first game process in step S3 shown in FIG. 16. In the first game process, firstly, in step S11, the processing section 21 transmits a notification of starting the first game, to the server 1 by using the communication section 25. For example, if a plurality of types of stages are prepared for the first game, the notification includes data indicating a stage, of the first game, to be started. Upon receiving the notification, the server 1 transmits, to the terminal apparatus 2, game data to be used for starting the first game (step S82 described later). The game data includes, for example, data indicating a game field to be used in the first game, data indicating enemy characters that appear in the first game, and the like. Next to step S11, the process in step S12 is executed.

In step S12, the processing section 21 receives the game data transmitted from the server 1. The processing section 21 can start the first game by using the received game data. Next to step S12, the process in step S13 is executed.

In step S13, the processing section 21 controls each character in the first game. That is, the processing section 21 controls a motion (e.g., movement and/or attack) of a possessed character according to an operation performed by the user, or controls a motion of an enemy character according to a rule determined by the game application. Moreover, when a possessed character has made an action, the processing section 21 increases the experience value of the possessed character according to need. Here, it is assumed that a motion of one character is controlled in one step S13. Next to step S13, the process in step S14 is executed.

In step S14, the processing section 21 determines whether or not the update condition in the first game has been satisfied. Specifically, the processing section 21 determines whether or not the experience value of a possessed character that appears in the first game has reached a predetermined value. When the determination result in step S14 is positive, the process in step S15 is executed. When the determination result in step S14 is negative, the process in step S15 is skipped, and the process in step S16 is executed.

In step S15, the processing section 21 strengthens the ability of the possessed character having satisfied the update condition. Specifically, the processing section 21 raises the value of the ability parameter (level or the like) of the possessed character. At this time, the first ability data in the possessed character data stored in the terminal apparatus 2 is updated so as to indicate the raised ability parameter. Next to step S15, the process in step S16 is executed.

In step S16, the processing section 21 determines whether or not to end the first game. That is, the processing section 21 determines whether or not the aforementioned end condition for the first game has been satisfied. When the determination result in step S16 is negative, the process in step S13 is again executed. Thereafter, a series of processes in steps S13 to S16 is repeatedly executed until it is determined to end the first game. When the determination result in step S16 is positive, the process in step S17 is executed.

In step S17, the processing section 21 transmits, to the server 1, game data indicating the game result of the first game. The game data may include data indicating the ability of the possessed character at the end of the game, in addition to the game result of the first game. Upon receiving the game data, the server 1 updates the data stored in the server 1 (step S84 described later). After step S17 has ended, the processing section 21 ends the first game process shown in FIG. 17.

Figure 18:
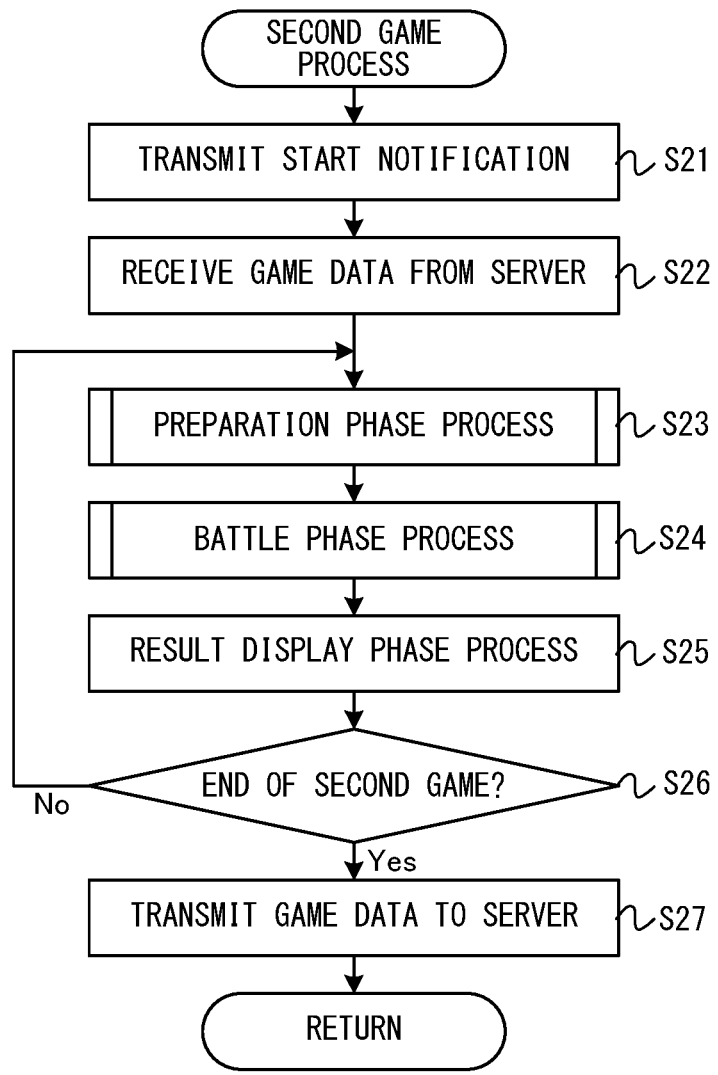
FIG. 18 is a sub flowchart showing an example of a specific flow of a second game process in step S5 shown in FIG. 16.

FIG. 18 is a sub flowchart showing an example of a specific flow of the second game process in step S5 shown in FIG. 16. In the second game process, firstly, in step S21, the processing section 21 transmits a notification of starting the second game, to the server 1 by using the communication section 25. This notification includes data indicating a use character to be used in the second game. That is, the processing section 21 selects a use character that is registered in advance (i.e., a character indicated by the registered character data) from among the possessed characters, and transmits, to the server 1, the notification including data indicating the selected use character. Upon receiving the notification, the server 1 transmits, to the terminal apparatus 2, game data to be used for starting the second game (step S88 described later). Next to step S21, the process in step S22 is executed.

In step S22, the processing section 21 receives the game data transmitted from the server 1. The processing section 21 can start the second game by using the received game data. In the present embodiment, the game data includes ability data indicating the ability set for the use character. Therefore, the processing section 21 can set the ability of the use character, based on the ability data. At this time, the processing section 21 updates the content of the second ability data in the use character data stored in the terminal apparatus 2, based on the ability data. The game data further includes opponent character data indicating the content of an enemy character (specifically, the type, placement, and ability of the enemy character) that appears in the second game. Therefore, the processing section 21 can set the type, placement, and ability of the enemy character in the second game, based on the opponent character data. At this time, the processing section 21 updates the content of the enemy character data stored in the terminal apparatus 2, based on the opponent character data. Next to step S22, the process in step S23 is executed.

In step S23, the processing section 21 executes a preparation phase process that is a game process in the aforementioned preparation phase. Hereinafter, the preparation phase process will be described in detail with reference to FIG. 19.

Figure 19:
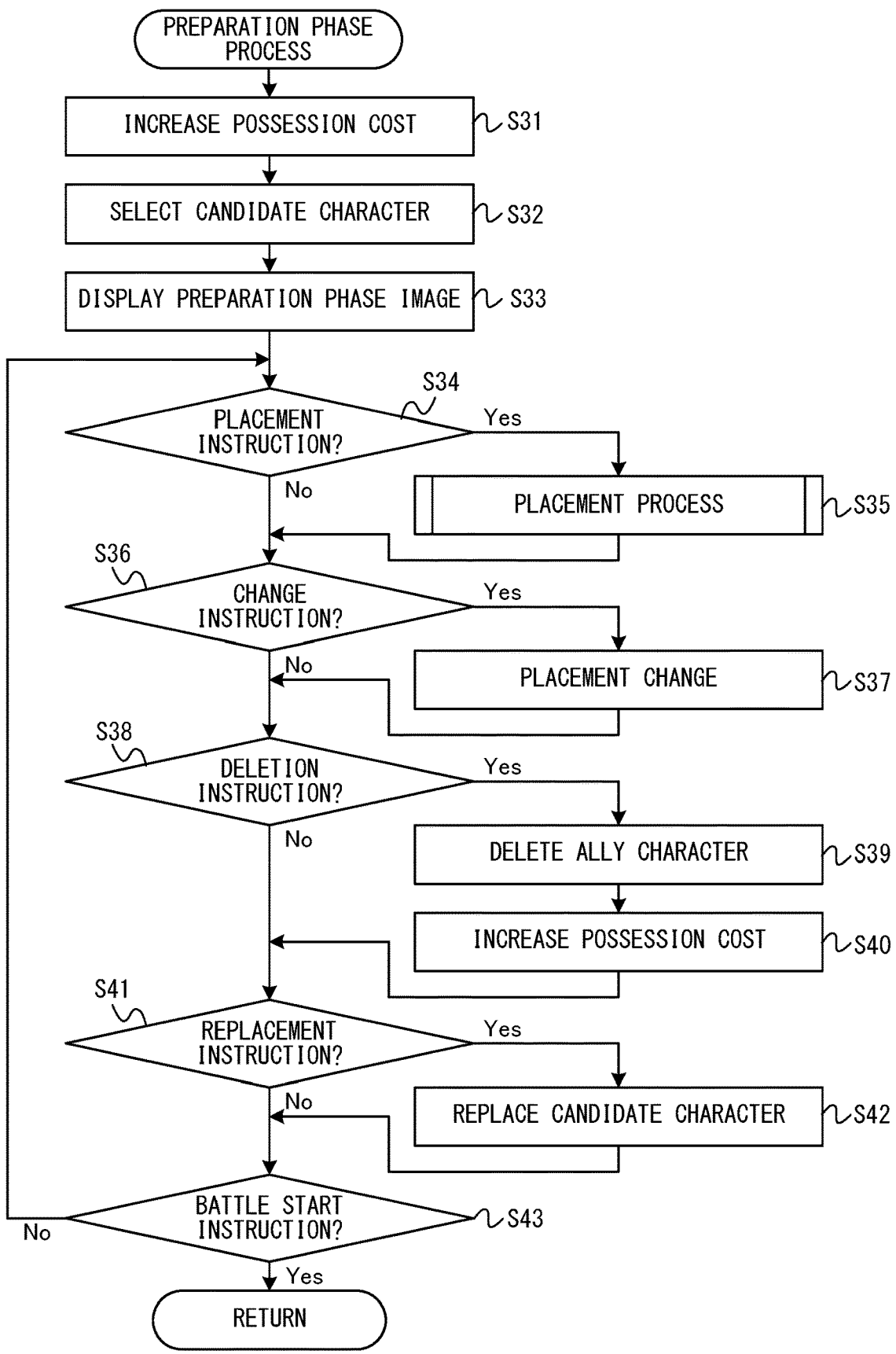
FIG. 19 is a sub flowchart showing an example of a specific flow of a preparation phase process in step S23 shown in FIG. 18.

FIG. 19 is a sub flowchart showing an example of a specific flow of the preparation phase process in step S23 shown in FIG. 18. In the preparation phase process, firstly, in step S31, the processing section 21 increases the possession cost of the user. In the present embodiment, the possession cost at start of the second game is 0, and the amount of increase in the possession cost is determined based on the number of turns at the current time point. Next to step S31, the process in step S32 is executed.

In step S32, the processing section 21 selects candidate characters from among the use characters. That is, the processing section 21 selects the candidate characters from among the use characters according to the method described in the above "[2-2-2. Preparation phase]" and "[2-2-5. Game in second and subsequent turns]". Next to step S32, the process in step S33 is executed.

In step S33, the processing section 21 causes the display section 24 to display the preparation phase image (see FIG. 7). That is, the processing section 21 places an ally character and an enemy character in the battle area, and places candidate characters in the candidate presentation area. Specifically, as for the ally character, in the first turn, an ally character selected from among the use characters is placed, and, in the second and subsequent turns, an ally character that was placed at start of the battle phase in the last turn is placed. The enemy character is placed according to the setting in the above step S22. As for the candidate characters, the candidate characters selected in the above step S32 are placed. Next to step S33, the process in step S34 is executed.

In step S34, the processing section 21 determines whether or not the user has made a placement instruction to place a character, designated from the candidate characters, as an ally character in the battle area or the waiting area. That is, the processing section 21 determines, based on data from the input section 23, whether or not an instruction input to move any of the candidate characters in the candidate presentation area to the own army area has been made. When the determination result in step S34 is positive, the process in step S35 is executed. When the determination result in step S34 is negative, the processes in steps S35 and S36 are skipped, and the process in step S37 is executed.

In step S35, the processing section 21 executes a placement process. The placement process is a process to be executed when an ally character is placed in the battle area. Hereinafter, the placement process will be described in detail with reference to FIG. 20.

Figure 20:
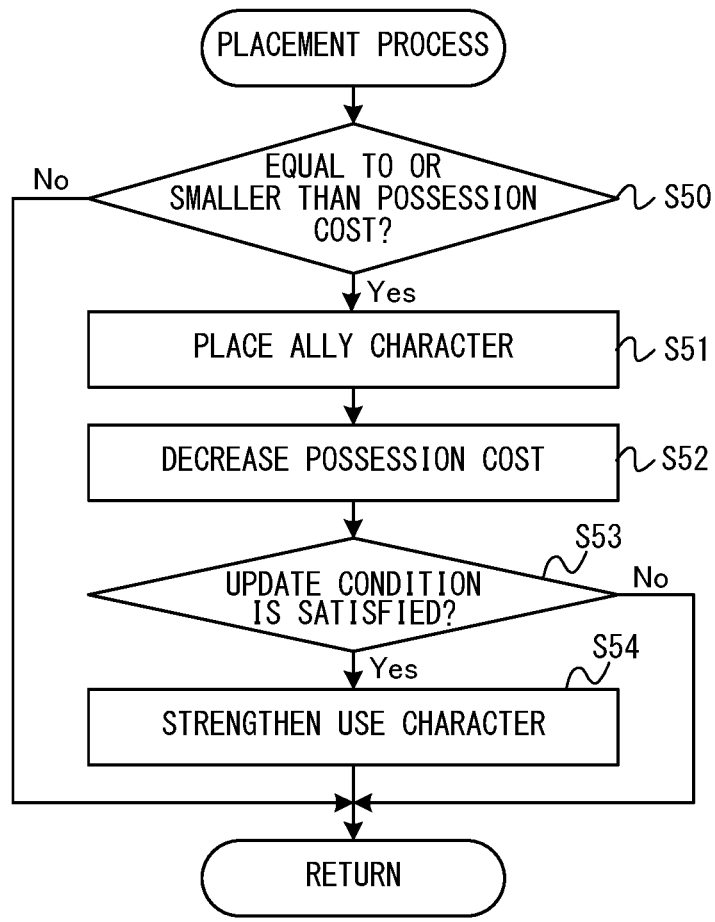
FIG. 20 is a sub flowchart showing an example of a specific flow of a placement process in step S35 shown in FIG. 18.

FIG. 20 is a sub flowchart showing an example of a specific flow of the placement process in step S35 shown in FIG. 18. In the placement process, firstly, in step S50, the processing section 21 determines whether or not the cost of the ally character designated by the placement instruction is equal to or smaller than the current possession cost of the user. When the determination result in step S50 is positive, the process in step S51 is executed. When the determination result in step S50 is negative, the processing section 21 ends the placement process shown in FIG. 19.

In step S51, the processing section 21 places the ally character designated by the placement instruction, in a position (i.e., a position in the battle area or the waiting area) designated by the placement instruction. Next to step S51, the process in step S52 is executed.

In step S52, the processing section 21 decreases the possession cost of the user by an amount of a score set on the ally character placed in step S51. Next to step S52, the process in step S53 is executed.

In step S53, the processing section 21 determines whether or not the update condition in the second game has been satisfied. That is, the processing section 21 determines whether or not three identical characters are simultaneously placed in the own army area. When the determination result in step S53 is positive, the process in step S54 is executed. When the determination result in step S53 is negative, the processing section 21 ends the placement process shown in FIG. 19.

In step S54, the processing section 21 strengthens the use characters. Specifically, the level of the use character having satisfied the update condition is raised by 10, while the level of other use characters is raised by 2. At this time, the processing section 21 updates the use character data stored in the terminal apparatus 2 such that the raised ability parameter is indicated. After step S54 has ended, the processing section 21 ends the placement process shown in FIG. 19. After the placement process has ended, the process in step S36 is executed.

Referring back to FIG. 18, in step S36, the processing section 21 determines whether or not the user has made a change instruction to change the placement of an ally character placed in the battle area or the waiting area. That is, the processing section 21 determines, based on data from the input section 23, whether or not an instruction input to move any of ally characters in the battle area or the waiting area. When the determination result in step S36 is positive, the process in step S37 is executed. When the determination result in step S36 is negative, the process in step S37 is skipped, and the process in step S38 is executed.

In step S37, the processing section 21 changes the position of the ally character designated by the change instruction. Next to step S37, the process in step S38 is executed.

In step S38, the processing section 21 determines, based on data from the input section 23, whether or not the user has made a deletion instruction to delete an ally character in the own army area or the waiting area. When the determination result in step S38 is positive, the process in step S39 is executed. When the determination result in step S38 is negative, the processes in steps S39 and S40 are skipped, and the process in step S41 is executed.

In step S39, the processing section 21 deletes the ally character designated by the deletion instruction from the battle area or the waiting area. Next to step S39, the process in step S40 is executed.

In step S40, the processing section 21 increases the possession cost of the user by an amount corresponding to a score set on the ally character deleted in step S39. Next to step S40, the process in step S41 is executed.

In step S41, the processing section 21 determines whether or not the user has made the replacement instruction to replace the candidate characters. That is, the processing section 21 determines, based on data from the input section 23, whether or not an input of designating the replacement instruction image has been made. When the determination result in step S41 is positive, the process in step S42 is executed. When the determination result in step S41 is negative, the process in step S42 is skipped, and the process in step S43 is executed.

In step S42, the processing section 21 replaces the candidate characters presented in the candidate presentation area. That is, the processing section 21 executes a process of selecting candidate characters from the use characters, and places the newly selected candidate characters in the candidate presentation area. The selection process in step S42 may be the same as the selection process in step S32. Next to step S42, the process in step S43 is executed.

In step S43, the processing section 21 determines whether or not the user has made the battle start instruction to start the battle phase. That is, the processing section 21 determines, based on data from the input section 23, whether or not an input of designating the start instruction image has been made. When the determination result in step S43 is negative, the process in step S34 is executed again. Thereafter, a series of processes in steps S34 to S43 is repeatedly executed until it is determined in step S43 that the battle start instruction has been made. When the determination result in step S43 is positive, the processing section 21 ends the preparation phase process shown in FIG. 19.

Next to the preparation phase process in step S23, the processing section 21 executes, in step S24, a battle phase process that is a game process in the aforementioned battle phase. Hereinafter, the battle phase process will be described in detail with reference to FIG. 21.

Figure 21:
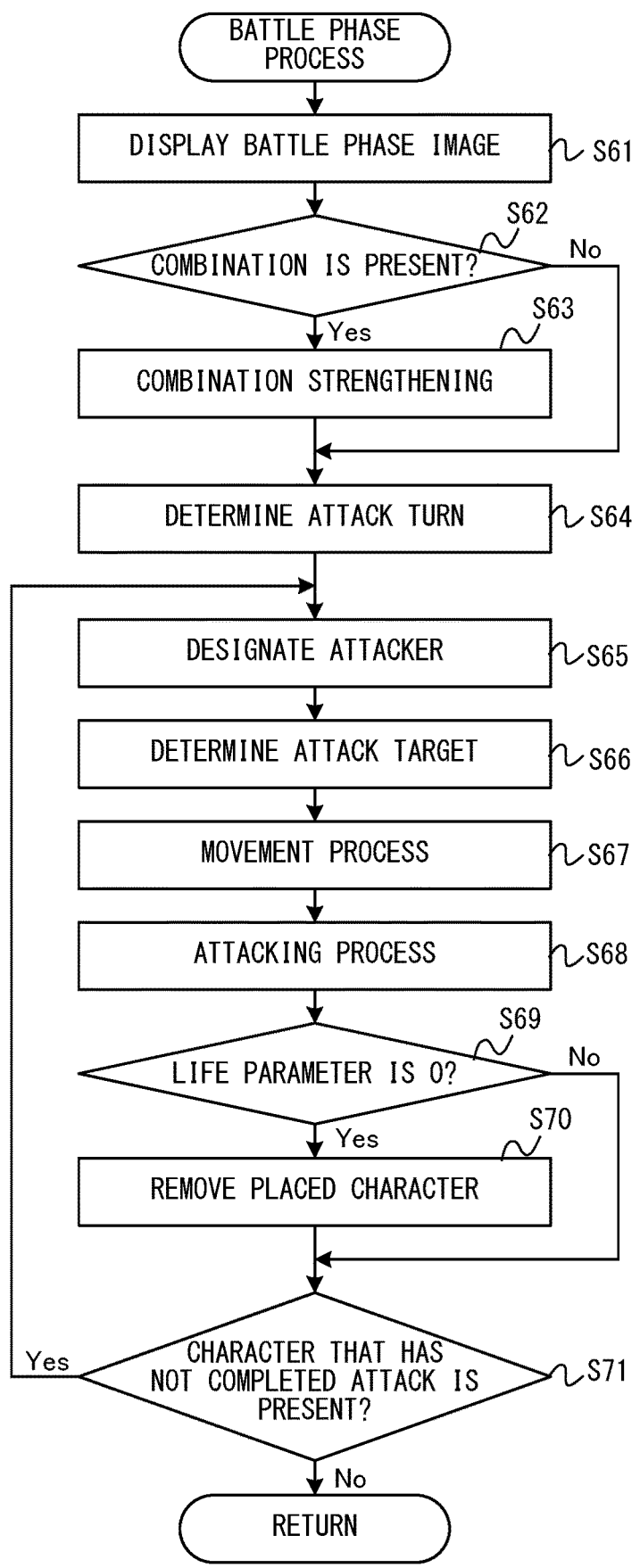
FIG. 21 is a sub flowchart showing an example of a specific flow of a battle phase process in step S24 shown in FIG. 18.

FIG. 21 is a sub flowchart showing an example of a specific flow of the battle phase process in step S24 shown in FIG. 18. In the battle phase process, firstly, in step S61, the processing section 21 causes the display section 24 to display the battle phase image (see FIG. 9). Next to step S61, the process in step S62 is executed.

In step S62, the processing section 21 determines whether or not a combination to be subjected to the aforementioned combination strengthening is included in the placed characters at start of the battle phase. When the determination result in step S62 is positive, the process in step S63 is executed. When the determination result in step S62 is negative, the process in step S63 is skipped, and the process in step S64 is executed.

In step S63, the processing section 21 strengthens the placed characters by the combination strengthening. That is, the processing section 21, according to the combination of the placed characters, raises the ability parameters of the placed characters by using the method described in the above "[2-2-7. Strengthening based on arrangement of placed characters]". At this time, the processing section 21 updates the possessed character data stored in the terminal apparatus 2 such that the raised ability parameters are indicated. The processing section 21 restores the ability parameters raised in step S63 to the original values at the end of the current battle phase process. Moreover, in step S63, the processing section 21 causes the display section 24 to display the strengthening notification image and the strengthening total image for a predetermined time. After the strengthening notification image and the strengthening total image have been displayed for the predetermined time, the process in step S64 is executed.

In step S64, the processing section 21 determines attack turns of the characters placed in the battle area. The determination of attack turns is performed according to the method described in the above "[2-2-3. Battle phase]". Next to step S64, the process in step S65 is executed.

In step S65, the processing section 21 designates one placed character to be an attacker from among the placed characters in the battle area. Specifically, the processing section 21 designates a placed character having the earliest attack turn among the placed characters that have not yet completed attacks in the current battle phase process. Next to step S65, the process in step S66 is executed.

In step S66, the processing section 21 determines a placed character to be an attack target of an attack by the placed character as the attacker designated in step S65. The attack target is determined according to the method described in the above "[2-2-3. Battle phase]". Next to step S66, the process in step S67 is executed.

In step S67, the processing section 21 moves the placed character as the attacker to a position where the placed character can attack the placed character as the attack target (see FIG. 9). As described above, if another placed character is present in the destination position to which the placed character as the attacker moves, the processing section 21 interchanges the positions of the placed character as the attacker and the other placed character present in the destination position. Meanwhile, if the placed character as the attacker need not be moved (i.e., if the original position of the placed character as the attacker is a position where the placed character can attack the placed character as the attack target), the process of moving the placed character as the attacker is not executed. Next to step S67, the process in step S68 is executed.

In step S68, the processing section 21 executes an attacking process to the placed character as the attack target by the placed character as the attacker. That is, according to the method described in the above "[2-2-3. Battle phase]", the processing section 21 calculates an amount of damage due to an attack by the placed character as the attacker, and decreases the life parameter of the placed character as the attack target, based on the amount of damage. If the aforementioned counterattack condition is satisfied, the processing section 21 calculates an amount of damage due to a counterattack by the placed character as the attack target, and decreases the life parameter of the placed character as the attacker, based on the amount of damage. At this time, the processing section 21 updates the use character data and the enemy character data stored in the terminal apparatus 2 such that the decreased life parameter is indicated. Next to step S68, the process in step S69 is executed.

In step S69, the processing section 21 determines whether or not there is a placed character whose life parameter has become 0. When the determination result in step S69 is positive, the process in step S70 is executed. When the determination result in step S69 is negative, the process in step S70 is skipped, and the process in step S71 is executed.

In step S70, the processing section 21 removes the placed character, the value of the life parameter of which has become 0, from the battle area. Next to step S70, the process in step S71 is executed.

In step S71, the processing section 21 determines whether or not there is a placed character that has not yet completed an attack among the characters placed in the battle area. When the determination result in step S71 is positive, the process in step S65 is again executed. Thereafter, a series of processes in steps S65 to S71 is repeatedly executed until it is determined in step S71 that there is no placed character that has not yet completed an attack. On the other hand, when the determination result in step S71 is negative, the processing section 21 ends the battle phase process shown in FIG. 21.

Referring back to FIG. 18, next to the battle phase process in step S24, the processing section 21 executes a result display phase process in step S25. Specifically, the processing section 21 calculates, as a game result of the battle phase in step S24, a win/loss result of the game and a score of the user, and displays the game result on the display section 24. Next to step S25, the process in step S26 is executed.

In step S26, the processing section 21 determines whether or not to end the second game. Specifically, the processing section 21 determines whether or not the number of turns of the second game being executed has reached the number of turns that is set according to the class of the user. When the determination result in step S26 is negative, the process in step S23 is again executed. Thereafter, a series of processes in steps S23 to S26 is repeatedly executed until it is determined in step S26 to end the second game. When the determination result in step S26 is positive, the process in step S27 is executed.

In step S27, the processing section 21 transmits, to the server 1, game data indicating the game result of the second game. The game data includes play data of the second game in addition to the game result of the second game. Upon receiving the game data, the server 1 updates the data stored therein (step S80 described later) After step S27 has ended, the processing section 21 ends the second game process shown in FIG. 18.

[3-3. Processing Performed by Server]

FIG. 22 is a flowchart showing an example of a flow of server processing executed by the server. The server processing shown in FIG. 22 is started when the aforementioned play-allowed period is started.

In the server processing shown in FIG. 22, firstly, in step S81, the processing section 11 determines whether or not the notification of starting the first game (step S11) has been received from the terminal apparatus 2 via the communication section 13. When the determination result in step S81 is positive, the process in step S82 is executed. When the determination result in step S81 is negative, the process in step S82 is skipped, and the process in step S83 is executed.

In step S82, the processing section 11 transmits the game data to be used in the first game, to the terminal apparatus 2 by using the communication section 13. The game data includes, for example, the data indicating the game field to be used in the first game, the data indicating the enemy characters that appear in the first game, and the like. Next to step S82, the process in step S83 is executed.

In step S83, the processing section 11 determines whether or not the game data indicating the game result of the first game (step S17) has been received from the terminal apparatus 2 via the communication section 13. When the determination result in step S83 is positive, the process in step S84 is executed. When the determination result in step S83 is negative, the process in step S84 is skipped, and the process in step S85 is executed.

In step S84, the processing section 11 updates the data stored in the server 1, based on the game data received in step S83. For example, the processing section 11 updates the first ability data in the possessed character data stored in the server 1 such that the ability at the end of the first game is indicated. For example, if a plurality of stages are prepared for the first game and data indicating the clear state of each stage is stored in the server 1, the processing section 11 update the data indicating the clear state according to the game result indicated by the game data. Next to step S84, the process in step S85 is executed.

In step S85, the processing section 11 determines whether or not the notification of starting the second game (step S21) has been received from the terminal apparatus 2 via the communication section 13. When the determination result in step S85 is positive, the process in step S86 is executed. When the determination result in step S85 is negative, the processes in steps S86 to S88 are skipped, and the process in step S87 is executed.

In step S86, the processing section 11 sets the ability of a use character. Specifically, the processing section 11 sets the ability of a use character that is indicated by data included in the notification received in step S85, according to the method described in the above "[2-2-1. Setting of use character]". Next to step S86, the process in step S87 is executed.

In step S87, the processing section 11 determines another user to be an opponent of the user of the terminal apparatus 2 in the second game. The opponent user is determined according to the method described in the above "[2-2-8. Setting of enemy character]", based on the class of the user of the terminal apparatus 2. The processing section 11 determines the user to be an opponent, with reference to the class data, of each user, stored in the server 1. Next to step S87, the process in step S88 is executed.

Determination of an opponent user need not be executed each time the user executes the second game, and the opponent user may be fixed during a predetermined period (e.g., the aforementioned sub period or play-allowed period). At this time, the processing section 11 need not perform determination of an opponent user each time it receives the notification of starting the second game.

In step S88, the processing section 11 transmits the game data to be used in the second game to the terminal apparatus 2 by using the communication section 13. Specifically, the processing section 11 generates game data including: ability data indicating the ability of the use character set in step S86; and opponent character data indicating the contents of enemy characters that appear in the second game. Then, the processing section 11 transmits the game data to the terminal apparatus 2. The opponent character data includes: data of enemy characters that appear in the first to third turns of the second game; and play data, related to the opponent user, to be used for setting enemy characters in the fourth and subsequent turns. Next to step S88, the process in step S89 is executed.

In step S89, the processing section 11 determines whether or not the game data indicating the game result in the second game (step S27) has been received from the terminal apparatus 2 via the communication section 13. When the determination result in step S89 is positive, the process in step S90 is executed. When the determination result in step S89 is negative, the process in step S90 is skipped, and the process in step S91 is executed.

In step S90, the processing section 11 updates the data stored in the server 1, based on the game data received in step S89. Specifically, the processing section 11 updates the score data stored in the server 1, based on result data that is included in the game data and indicates the game result (i.e., data indicating the score in the second game). The score data is updated such that the score indicated by the result data is added to the cumulative score of the user in the current play-allowed period. If the score indicated by the result data is higher than a high score indicated by the score data stored in the server 1, the high score indicated by the score data is updated.

In step S90, the processing section 11 updates the play data stored in the server 1, based on the play data, of the second game, included in the game data. The server 1 may not necessarily store therein all the play data related to the second game. The server 1 may store therein only the latest play data of one user. If the user becomes an opponent in the second game that is performed by another user, the play data of the user stored in the server 1 is transmitted to the terminal apparatus of the other user in step S88. Next to step S90, the process in step S91 is executed.

In step S91, the processing section 11 determines whether or not the aforementioned sub period has ended. When the determination result in step S91 is positive, the process in step S92 is executed. When the determination result in step S91 is negative, the process in step S92 is skipped, and the process in step S93 is executed.

In step S92, the processing section 11 determines the class of each user. Specifically, the processing section 11 changes the class of each user, based on the high score indicated by the score data, of each user, stored in the server 1 (see the above "[2-2-9. Reward]"). At this time, the processing section 11 updates the class data of each user stored in the server 1 such that the changed class is indicated. Next to step S92, the process in step S93 is executed.

In step S93, the processing section 11 determines whether or not the aforementioned play-allowed period has ended. When the determination result in step S91 is positive, the process in step S94 is executed. When the determination result in step S93 is negative, the process in step S81 is again executed. Thereafter, a series of processes in steps S81 to S93 is repeatedly executed until it is determined in step S93 that the play-allowed period has ended.

In step S94, the processing section 11 gives a reward to the user. Specifically, the processing section 11 determines the content of the reward to be given to the user, based on the score data stored in the server 1 (specifically, the cumulative score, in the current play-allowed period, indicated by the score data). The processing section 11 updates the reward data stored in the server 1 such that the determined content of the reward is included. Thus, the reward is given to the user. A timing at which the reward is actually received (i.e., reward data is received by the terminal apparatus 2) is arbitrary. In the present embodiment, when the terminal apparatus 2 accesses the server 1 after the reward data is stored in the server 1, the server 1 transmits the reward data to the terminal apparatus 2, whereby the reward is received by the terminal apparatus 2. After step S94, the processing section 11 ends the server processing shown in FIG. 22.

4. Function and Effect of Present Embodiment, and Modifications

As described above, according to the above embodiment, an information processing system (or a game system) executes a competitive game (e.g., the second game) consisting of a plurality of turns, and displays a game image of a virtual space of the competitive game on a display device. The information processing system includes at least one processor (e.g., the CPU of the processing section 11 and/or the CPU of the processing section 21), and storage means (e.g., the storage section 12 or the storage section 22).

The processor performs the following operations in each turn.

Placing a plurality of candidate objects (e.g., candidate characters) in a first area (e.g., the candidate presentation area) in the virtual space (step S33).

Placing one or more candidate objects, which are selected by a user from among the plurality of candidate objects placed in the first area, as ally objects (e.g., ally characters) in a second area (e.g., the own army area) in a battle area in the virtual space, on condition that a consumption cost associated with each of the selected candidate objects does not exceed a possession cost associated with the user (step SM), and decreasing the possession cost according to a consumption cost associated with each of the ally objects (step S52).

Placing one or more enemy objects (e.g., enemy characters) in a third area (e.g., the enemy army area) in the battle area (step S33).

Based on positions of placed objects (e.g., placed characters) that are the ally objects or the enemy objects placed in the battle area, determining, for each placed object, an attack turn, and an attack target out of the placed objects (steps S64 and S66).

Executing an attack on the attack target by the placed object according to the attack turn, thereby decreasing a life parameter associated with the placed object that is the attack target (step S68).

Deleting the placed object whose life parameter becomes equal to or lower than a threshold due to the attack, from the second area or the third area (step S70).

After attacks by the respective placed objects in the battle area have ended, determining a game result (e.g., win/loss result or score of the game) in the current turn, based on a total value of life parameters associated with the ally objects placed in the second area, and a total value of life parameters associated with the enemy objects placed in the third area (step S25).

The processor starts a turn next to a certain turn in a state where ally objects that were placed in the second area at start of the certain turn are left (step S33).

The processor calculates a user parameter (e.g., game score) associated with the user, based on the game result in each turn (step S25). After the plurality of turns have ended (e.g., after the play-allowed period has ended), the processor gives an in-game reward to the user, based on the value of the user parameter (step S94).

According to the above embodiment, the competitive game is performed even without an instruction, made by the user, which designates an attack turn and an attack target of each placed object. This allows the user to readily play the competitive game.

In the above embodiment, the information processing system executes two different types of games, i.e., the first game and the second game. In another embodiment, the information processing system may not necessarily execute the first game. Even in this case, the information processing system exerts, with the second game, the above effect that the user can readily play the competitive game.

In the present embodiment, the competitive game in which each placed object perform an attack on an attack target, has been described. In another embodiment, each placed object may perform an action (e.g., recovery, or any action that changes the appearance of a target) other than an attack. At this time, based on the positions of placed objects that are ally objects or enemy objects placed in a battle area, the information processing system may determine, for each placed object, an action turn, and an action target out of the placed objects. At this time, the information processing system may execute an action on the action target by the placed object according to the action turn, thereby changing an object parameter associated with the placed object that is the action target. The object parameter may be the aforementioned life parameter, or a parameter indicating an amount of damage or the number of attacks applied to the object. The information processing system may delete a placed object whose object parameter has satisfied a deletion condition due to the action, from the second area or the third area. The information processing system may determine a game result in the current turn, based on a total value of object parameters associated with the ally objects placed in the second area, and a total value of the object parameters associated with the enemy objects placed in the third area. Also in this case, the information processing system exerts, with the second game, the above effect that the user can readily play the competitive game.

According to the above embodiment, it can also be said that an information processing system (or a game system) has the following configuration.

Storage means (e.g., the storage section 12 or the storage section 22) configured to store therein first ability data indicating abilities of possessed objects (e.g., possessed characters) in association with the respective possessed objects, the possessed objects being possessed by a user, the possessed object being used in a first game executed by a game program.

Selection means configured to select, from among the possessed objects, a use object (e.g., use character) to be used in a second game that is executed by the game program and is different from the first game (step S21).

Ability setting means configured to set second ability data indicating an ability of the use object such that the second ability data indicates an ability lower than the ability indicated by the first ability data associated with the possessed object that becomes the use object (step S86).

Second game execution means configured to execute the second game, based on the second ability data set on the use object (step S5).

First update means configured to, when an update condition regarding the use object has been satisfied during execution of the second game, update the second ability data such that the ability of the use object having satisfied the update condition is strengthened (step S54).

Moreover, regarding the update of the second ability data by the first update means, an upper limit is set on at least a part (e.g., skill and additional strengthening) of the ability of the use object, based on the ability indicated by the first ability data.

According to the above configuration, as for a use object whose ability is set based on a possessed object used in the first game, the ability of the use object is strengthened in the second game. This provides a new game in which an object in another game (i.e., the first game) can be grown during the game.

In the above embodiment, each of the first game and the second game is a competitive type simulation game. However, the content and genre of the first game and the second game are arbitrary. In another embodiment, the first game and the second game may be a puzzle game or a role-playing game. Regardless of the content and genre of the first game and the second game, the above configuration exerts an effect of providing a new game.

The "at least a part of the ability of the use object" corresponds to, in the above embodiment, the rarity and the skill among the abilities (i.e., the ability parameter, the rarity, and the skill) of the possessed character. However, in another embodiment, as for the ability parameter, the information processing system may update the second ability data by using, as an upper limit, the content that is set based on the upper limit of the ability indicated by the first ability data.

In the above embodiment, the information processing system sets the second ability data indicating the ability (e.g., skill) of the use character in the second game, based on the first ability data, regarding the possessed character to be the use character, which is stored in the storage means when the second game is started. Thus, the ability of the possessed character can be reflected in the use character, whereby motivation to play the first game can be given to the user who plays the second game.

In the above embodiment, the first ability data indicates at least one ability parameter among the level, physical strength, attack power, defense power, and quickness of the possessed object, and the information processing system sets the second ability data such that the value of the ability parameter indicated by the second ability data is lower than that indicated by the first ability data. Moreover, in the above embodiment, the first ability data indicates one of a plurality types of skills, of the same category, which exert effects of the same type and of different magnitudes in the game, and the information processing system sets the second ability data such that the second ability data indicates a skill that is of the same category as the skill indicated by the first ability data and that is smaller in effect than the skill indicated by the first ability data. Thus, the first ability data may indicate the ability parameter or the skill.

In the above embodiment, the information processing system executes the first game, based on the first ability data associated with a possessed object (step S4). When the update condition regarding a possessed object (i.e., the update condition in the first game) has been satisfied, the information processing system updates the first ability data such that the ability of the possessed object having satisfied the update condition is strengthened (step S15). Thus, by strengthening the ability in the first game, the upper limit of the ability is raised also in the second game, which is advantageous to the user also in the second game. Therefore, motivation to play the first game can be given to the user.

The content of the update condition in each game is arbitrary. In the above embodiment, the update condition in the second game is different from the update condition in the first game. In another embodiment, the update condition in the second game may be same as the update condition in the first game. In still another embodiment, the update condition may not necessarily be set in the first game.

In another embodiment, the information processing system may not include some of the components in the above embodiment, and may not execute some of the processes executed in the above embodiment. For example, in order to achieve a specific effect of a part of the above embodiment, the information processing system only needs to include a configuration for achieving the effect and execute a process for achieving the effect, and need not include other configurations and need not execute other processes.

The above embodiment can be used, for example, as a game system and a game program, for the purpose of making it more readily for the user to play, for example, a game in which allies and enemies fight against each other.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing system, comprising:
a processor and a memory coupled thereto,
the memory being configured to store therein first ability data indicating abilities of one or more possessed objects in association with the respective possessed objects, the possessed objects being possessed by a user, the possessed objects being used in a first game executed by a game program,
the processor being configured to control the information processing system to at least:
select, from among the possessed objects, a use object to be used in a second game that is executed by the game program and is different from the first game;
set second ability data indicating an ability of the use object in the second game such that the second ability data indicates an ability lower than the ability indicated by the first ability data associated with the possessed object that becomes the use object;
execute, based on the second ability data set on the use object, the second game, wherein execution of the second game includes automatically controlling, without relying on input from the user, the use object as part of the second game; and
based on the automatically controlled use object and when an update condition regarding the use object has been satisfied during execution of the second game, update the second ability data such that the ability of the use object having satisfied the update condition is strengthened,
wherein regarding the update of the second ability data, an upper limit is set on at least a part of the ability of the use object, based on the ability indicated by the first ability data,
wherein in updating the second ability data, regarding the at least a part of the ability of the use object, an upper limit of the ability indicated by the first ability data is made the same as the ability indicated by the second ability data.

2. The information processing system according to claim 1, wherein the processor is configured to further control the information processing system to at least:
execute the first game, based on the first ability data associated with the possessed object; and
when an update condition regarding the possessed object has been satisfied, update the first ability data such that the ability of the possessed object having satisfied the update condition is strengthened.

3. The information processing system according to claim 2, wherein the update condition regarding the possessed object is different from the update condition regarding the use object.

4. The information processing system according to claim 1, wherein each time the second game is newly started, second ability data indicating the ability of the use object in the second game is set.

5. The information processing system according to claim 1, wherein the second ability data indicating the ability of the use object in the second game is set based on the first ability data that is stored in the memory at start of the second game and relates to the possessed object that becomes the use object.

6. The information processing system according to claim 1, wherein regarding the at least a part of the ability of the use object, the second ability data is updated with an upper limit being greater than an upper limit of the ability indicated by the first ability data.

7. The information processing system according to claim 1, wherein the memory further stores therein first ability data related to possessed objects that are possessed by another user different from the user, and
the use object is selected from among the possessed objects of the user and the possessed objects of the other user.

8. The information processing system according to claim 1, wherein when the update condition regarding the use object has been satisfied during execution of the second game, the second ability data is updated such that the ability of the use object having satisfied the update condition and the ability of another use object different from the use object are strengthened.

9. The information processing system according to claim 8, wherein
when the update condition regarding the use object has been satisfied during execution of the second game, the second ability data is updated such that the ability of the use object having satisfied the update condition is more strengthened than the ability of the other use object.

10. The information processing system according to claim 1, wherein the first ability data indicates at least one of ability parameters, of the possessed object, including a level, a physical strength, an attack power, a defense power, and a quickness, and
the second ability data is set to a value smaller than a value of the ability parameter indicated by the first ability data.

11. The information processing system according to claim 1, wherein the first ability data indicates one of a plurality of types of skills, of the same category, that exert effects of the same type and of different magnitudes in the game, and
the second ability data is set so as to indicate a skill that is of the same category as the skill indicated by the first ability data and has an effect smaller in magnitude than the skill indicated by the first ability data.

12. The information processing system according to claim 1, wherein in the second game, the use object based on the set second ability data is placed in a virtual space of the second game, and
when the update condition regarding the use object placed in the virtual space has been satisfied during execution of the second game, the use object having satisfied the update condition is changed so as to have an ability based on the updated second ability data.

13. A non-transitory computer-readable storage medium having stored therein instructions that, when executed by a processor of an information processing apparatus, cause the information processing apparatus to perform operations comprising:
acquiring, from the information processing apparatus, first ability data indicating abilities of one or more possessed objects that are possessed by a user and are used in a first game;
selecting, from among the possessed objects, a use object to be used in a second game that is executed by the game program and is different from the first game;
executing, based on the second ability data set on the use object, the second game, wherein execution of the second game includes automatically controlling, without relying on input from the user, the use object as part of the second game; and
based on the automatically controlled use object and when an update condition regarding the use object has been satisfied during execution of the second game, updating the second ability data such that the ability of the use object having satisfied the update condition is strengthened, wherein
regarding the update of the second ability data, an upper limit is set on at least a part of the ability of the use object, based on the ability indicated by the first ability data,
wherein in updating the second ability data, regarding the at least a part of the ability of the use object, an upper limit of the ability indicated by the first ability data is made the same as the ability indicated by the second ability data.

14. An information processing apparatus, comprising:
a processor and a memory coupled thereto;
the memory being configured to store therein first ability data indicating abilities of one or more possessed objects in association with the respective possessed objects, the possessed objects being possessed by a user, the possessed objects being used in a first game,
the processor being configured to control the information processing system to at least:
select, from among the possessed objects, a use object to be used in a second game that is executed by the game program and is different from the first game;
execute, based on the second ability data set on the use object, the second game, wherein execution of the second game includes automatically controlling, without relying on input from the user, the use object as part of the second game; and
based on the automatically controlled use object and when an update condition regarding the use object has been satisfied during execution of the second game, update the second ability data such that the ability of the use object having satisfied the update condition is strengthened, wherein
regarding the update of the second ability data, an upper limit is set on at least a part of the ability of the use object, based on the ability indicated by the first ability data,
wherein in updating the second ability data, regarding the at least a part of the ability of the use object, an upper limit of the ability indicated by the first ability data is made the same as the ability indicated by the second ability data.

15. A game processing method executed by an information processing system,
the information processing system being configured to store therein first ability data indicating abilities of one or more possessed objects in association with the respective possessed objects, the possessed objects being possessed by a user, the possessed objects being used in a first game executed by a game program,
the processor being configured to:
select, from among the possessed objects, a use object to be used in a second game that is executed by the game program and is different from the first game;
set second ability data indicating an ability of the use object in the second game such that the second ability data indicates an ability lower than the ability indicated by the first ability data associated with the possessed object that becomes the use object;
execute, based on the second ability data set on the use object, the second game, wherein execution of the second game includes automatically controlling, without relying on input from the user, the use object as part of the second game; and
based on the automatically controlled use object and when an update condition regarding the use object has been satisfied during execution of the second game, update the second ability data such that the ability of the use object having satisfied the update condition is strengthened, wherein
regarding the update of the second ability data, an upper limit is set on at least a part of the ability of the use object, based on the ability indicated by the first ability data,
wherein in updating the second ability data, regarding the at least a part of the ability of the use object, an upper limit of the ability indicated by the first ability data is made the same as the ability indicated by the second ability data.

* * * * *